(12) United States Patent
Carpenter

(10) Patent No.: US 10,584,535 B1
(45) Date of Patent: Mar. 10, 2020

(54) BI-DIRECTIONAL WELL DRILLING

(71) Applicant: William Thomas Carpenter, Houston, TX (US)

(72) Inventor: William Thomas Carpenter, Houston, TX (US)

( * ) Notice: Subject to any disclaimer, the term of this patent is extended or adjusted under 35 U.S.C. 154(b) by 0 days.

(21) Appl. No.: 16/427,848

(22) Filed: May 31, 2019

Related U.S. Application Data

(63) Continuation-in-part of application No. 15/809,063, filed on Nov. 10, 2017, now abandoned.

(51) Int. Cl.
| | | |
|---|---|---|
| *E21B 4/04* | (2006.01) | |
| *E21B 17/02* | (2006.01) | |
| *E21B 17/046* | (2006.01) | |
| *E21B 4/02* | (2006.01) | |
| *E21B 17/00* | (2006.01) | |
| *F16H 3/14* | (2006.01) | |

(52) U.S. Cl.
CPC ............... *E21B 4/04* (2013.01); *E21B 4/02* (2013.01); *E21B 17/003* (2013.01); *E21B 17/028* (2013.01); *E21B 17/046* (2013.01); *F16H 3/14* (2013.01)

(58) Field of Classification Search
CPC . E21B 4/02; E21B 4/04; E21B 17/028; E21B 17/03; E21B 17/046
See application file for complete search history.

(56) References Cited

U.S. PATENT DOCUMENTS

| | | | | |
|---|---|---|---|---|
| 2,531,120 | A * | 11/1950 | Feaster | E21B 4/04 175/104 |
| 2,961,078 | A | 11/1961 | Shannon et al. | |
| 3,807,502 | A * | 4/1974 | Heilhecker | E21B 17/003 166/385 |
| 3,926,269 | A * | 12/1975 | Cullen | E21B 4/04 175/104 |
| 3,934,660 | A * | 1/1976 | Nelson | B65H 75/425 175/102 |
| 4,016,943 | A * | 4/1977 | Cullen | E21B 4/04 175/65 |
| 4,679,636 | A | 7/1987 | Ruhle | |
| 4,828,050 | A * | 5/1989 | Hashimoto | E21B 7/062 175/45 |
| 6,123,561 | A * | 9/2000 | Turner | E21B 17/028 439/194 |
| 6,186,922 | B1 | 2/2001 | Bursal et al. | |
| 7,806,191 | B2 | 10/2010 | Braden et al. | |
| 7,810,585 | B2 | 10/2010 | Downton | |
| 2002/0135179 | A1* | 9/2002 | Boyle | E21B 17/028 285/21.1 |

(Continued)

FOREIGN PATENT DOCUMENTS

WO  WO 2007019319  2/2017

*Primary Examiner* — William D Hutton, Jr.
*Assistant Examiner* — Steven A Macdonald
(74) *Attorney, Agent, or Firm* — Douglas Baldwin, PC.

(57) ABSTRACT

Apparatus and methods for bi-directional drilling using a bi-rotational bottom hole assembly. In preferred embodiments, the bottom hole assembly combines electric and mud motors. A central combination retrieval and electrical power cable supplies power to the motor and provides for retrieval of the bottom hole assembly to the surface. The pipe string is bi-rotational combination drill and casing pipe and connections.

19 Claims, 8 Drawing Sheets

(56) References Cited

U.S. PATENT DOCUMENTS

| | | | |
|---|---|---|---|
| 2002/0193004 A1* | 12/2002 | Boyle | E21B 17/028 439/577 |
| 2003/0034177 A1* | 2/2003 | Chitwood | E21B 4/04 175/61 |
| 2003/0056990 A1 | 3/2003 | Oglesby | |
| 2005/0022999 A1* | 2/2005 | Hughes | E21B 17/028 166/380 |
| 2005/0023831 A1* | 2/2005 | Hughes | E21B 17/028 285/330 |
| 2007/0284873 A1* | 12/2007 | Funke | E21B 17/028 285/112 |
| 2008/0041575 A1* | 2/2008 | Clark | E21B 17/003 166/65.1 |
| 2009/0308656 A1* | 12/2009 | Chitwood | E21B 4/04 175/40 |
| 2013/0228373 A1 | 9/2013 | Scholz | |
| 2014/0196953 A1* | 7/2014 | Chitwood | E21B 33/1243 175/57 |
| 2015/0322736 A1 | 10/2015 | Carpenter | |
| 2016/0356089 A1* | 12/2016 | Nanayakkara | E21B 4/02 |

* cited by examiner

BI-DIRECTIONAL WELL DRILLING

CROSS-REFERENCE TO RELATED APPLICATION

This application is a continuation-in-part of currently pending U.S. application Ser. No. 15/809,063, filed Nov. 10, 2017, the disclosure of which is incorporated herein by reference for all purposes.

FEDERALLY SPONSORED RESEARCH

Not Applicable

SEQUENCE LISTING

No Applicable

BACKGROUND OF THE INVENTION

Field of the Invention

This invention is in the field of drilling wells and specifically in methods and apparatus for bi-directional bottom hole assemblies; bi-directional bottom hole assemblies comprising dual motors, including an electric motor; bi-directional pipe strings and pipe couplings; drilling in both directions with a single pipe array; and using the same pipe array for drilling and casing.

Description of the Related Art

Conventional Drilling System

Conventionally, in the drilling of wells, particularly oil and gas wells, a substantial pipe, commonly referred to as "drill pipe," is used. Individual drill pipe joints are typically joined together with heavy-weight connecting devices that will withstand the required tensional, torsional and pressure forces, as well as the repeated coupling and uncoupling necessary to change, replace or modify the bottom hole assembly (BHA), especially the down hole-drilling devices. The assembled drill pipe is used to both rotate drilling devices and provide a conduit for the "drilling mud" (equivalently referred to herein as "drilling fluid") that cools, lubricates and cleans the down-hole drilling devices, while also carrying the resulting drilling debris back to the surface.

This heavy drill pipe, thus, requires heavy-weight, high-strength, surface equipment powered by high horsepower drives to achieve the required makeup and breakout torques required for fluid seal and tensional strength sufficient to manipulate this heavy weight of conventional drill pipe. Furthermore, because the drill pipe is rotated at the surface in order to drive the drilling apparatus, the drill pipe must be sufficient to endure the prolonged torsional stress and cyclical flexing fatigue over the relatively high number of revolutions required for drilling the hole to depth.

Deviations from a straight hole introduces or worsens cyclical flexing, and holes of extended length increase the radial flex that occurs, both of which contribute to premature failure of the drill string. In fact, deviations greater than approximately one to two (1-2) degrees can cause typically drill string to break. Accordingly, deviated holes are not typically drilled by driving the drilling device with the drill pipe string, but by use primarily of a mud motor alone for drilling motive, with a steering device.

After drilling a hole to a desired depth, the drill pipe is removed and a lighter weight and larger diameter pipe, commonly referred to as "casing" is installed and cemented in place to line and protect the already drilled hole. For deeper holes in which one single drill pipe assembly is not capable of drilling the entire depth, a larger hole is first drilled, as above, to sufficient depth. A smaller diameter hole is then drilled within the previously installed casing and penetrating further down below the first casing to another desired depth. This drill pipe is removed, and another section of casing is installed and cemented in place to line and protect the smaller newly drilled hole. This process is repeated until the desired depth is reached and the final casing to line and protect the final section of drilled hole has been installed and cemented.

Therefore, the entire process of drilling a well typically comprises first using drill pipe that can withstand both the required forces and the tensional and torsional wear and tear on the pipe as well as the wear and tear on the threads of multiple coupling and uncoupling operations that are necessary during the process of drilling a well, and then using casing to line and protect the drilled well. During this process, drilling mud fluid, as previously mentioned, is used to remove cuttings and debris from the drilling operation, clean and lubricate the down hole devices, control hydrostatic forces, temporarily line and protect the hole while being drilled, and "float" the casing installations as may be required.

Another drilling system comprises using a hydraulically operated motor that supplies rotational force to the drilling device. This hydraulic motor is powered by the drilling mud pumped from the surface, and does not require the drill pipe to be rotated to provide rotation to the drilling device.

Handling During the Operations

Heavily built surface equipment is used to pick up pipe, raise it, circulate drilling fluid, and lower it or rotate and lower it (depending on whether the casing is being rotated to actuate the drilling device, a mud motor is driving the drilling device, or both), depending on the type of bottom hole assembly (BHA) being utilized, thereby causing the drilling device attached to the lower end of the pipe to drill the desired hole until that section of pipe has been inserted into the hole its length. The operation continues to pick up the next pipe, insert it, and lower it or rotate and lower it, depending on the type of BHA being utilized, thereby causing the drilling device attached to the lower end of the pipe to drill the desired hole until the hole has been deepened the length of that pipe joint. The operation continues accordingly.

A drilling fluid is circulated to remove resulting cuttings, lubricate, clean and cool the bottom hole assembly and, depending on the type of bottom hole assembly being utilized (e.g. whether a mud motor is being used), may actuate some part of it. The circulated drilling fluid is also used to maintain pressure control during the process and to protect the well bore. The pipe used for drilling is designed to withstand the wear and tear of the tensional, torsional twist, burst and collapse stresses while providing weight control on the bottom hole assembly and drilling device during the drilling operation.

When the drilling bit or any other part of the BHA or drilling device is required to be replaced or modified all the drill pipe must be uncoupled and withdrawn from the well and generally placed in a surface racking device as so provided. After the drilling device or any other part of the BHA has been repaired, replaced or modified, in order to resume the process of actually drilling, all the drill pipe must be removed from the racking device, reconnected, and re-inserted into the well bore that has already been drilled.

This is a very labor intensive and time-consuming process creating substantial wear and tear on all the associated equipment during which time no progress in drilling the well is realized. It is common that a substantial percentage of the total operating time to drill a well is consumed by the unproductive drilling time that is necessary to withdraw and reinsert all the drill pipe to replace any part of the bottom hole assembly depending on the depth of the well being drilled. During this operation of removing, disassembling, and then reassembling and reinserting the drill string, a process known as "tripping" (as the pipe makes a trip out of and into the well), the drill pipe is at risk of being damaged, the pipe becoming stuck, or pressure control being lost due to the lack of circulation during this process.

After the drilling process is completed and the drill pipe withdrawn, another type of pipe, the casing, is inserted, lowered and/or floated into the well, and cemented in place to protect the walls of the bored hole and provide the interior operating space for the completion equipment used to produce from any formation that may have been encountered. Therefore, one type of heavy wall pipe is used for the drilling operations and another type of lighter wall pipe is subsequently used for protecting the resulting drilled hole. As mentioned previously, the drill pipe is a heavier type pipe that can withstand the forces encountered in the drilling and extensive tripping operations to replace the bottom hole assembly or drilling device, whereas the subsequently inserted casing pipe is required to protect the already drilled hole by lining the walls of the hole.

Conventionally, the initial hole drilled must be of a sufficient size to allow for the installation of succeeding smaller casing sizes as the wells reach depths exceeding the design tensile and bursting strengths of the uppermost pipes and the collapse strengths of the lowermost pipes, and also be of sufficient size to allow for the final, lowermost casing to be large enough to accommodate additional strings of production assemblies, which may include several tools known to those skilled in the art. The result must provide protection of the drilled hole, pressure control, clearance for cementing the annular space between the drilled hole and the casing, provide a protective string to the walls of the drilled hole to isolate and manage the various formations that were penetrated, and provide clearance for subsequent internal operating and production equipment.

A deficiency in the drilling, repair and maintenance of wells, particularly oil and gas wells, is the necessity of using one type of pipe for the drilling and tripping operations and subsequently replacing it with another type of pipe used to line and protect the resulting drilled hole. A further deficiency is the unproductive time spent in tripping, such as in the removal and reinsertion of all the drill pipe to renew the drilling device or modify the BHA.

Combination Drill and Casing Pipe

The difficulties with the separate drill pipe and casing system has, in recent years, been partially overcome by providing down-hole motors that operate the drill bit and bottom hole assemblies without the need for rotating drill pipe. In general, the motors used in this service are "mud" motors, that is motors driven by the flow of "drilling mud," as alluded to previously. These are theoretically more efficient in the field, since drilling mud is usually flowing, but lack flexibility and can be underpowered. Drilling mud is not always able to be kept continually flowing and so mud motors also suffer from being unable to drill, and potentially allowing some portion of the equipment to fail, when drilling mud is not flowing.

Electric Motors

Electric motors have been used and are generally preferred in theory. Electric drill motors have many advantages, such as drilling a better hole due to better speed control, but have the disadvantage that sufficient constant electric power is difficult to provide for the size of motors that are required for driving drilling equipment.

Drill Bits

One of the leading causes of 'tripping' (removing and reinstalling a drill string), or removing the down hole drilling equipment in the case of drilling with a mud motor, is dulling of the drill bit, which is a consumable item. As the drill bit penetrates rock and other earth formations, the teeth become dull, and the drill bit becomes increasingly less effective. Once the drill bit reaches a point at which the rate of penetration is too slow, or the risk of breakage of the drill or drill string is too high due to the increased pressure required to penetrate and the excess heat generated by a dull bit, the drill bit must be removed and replaced. This is typically a time-consuming and expensive operation, both in its own cost and in lost productivity. Additionally, as mentioned earlier, the process is fraught with risks to the equipment and the well. Accordingly, it is desired to extend the life of the drill bit.

Conclusion

What is needed is an efficient way to drill wells, particularly oil and gas wells, that provides consistent and sufficient power to the drill bit, while minimizing the need for tripping or removal, repair, or replacement of the down hole drilling equipment. The present invention provides such means.

BRIEF SUMMARY OF THE INVENTION

The present invention comprises methods and apparatus for bi-directional drilling in awell casing with at least dual motors to assist in providing consistent and sufficient power to the drill bit, at least one of which is an electric motor, and reduces the need for tripping or removal, repair, or replacement of down hole drilling equipment.

Some embodiments utilize at least one down hole electric motor for drilling within a well casing using a combination retrieval-electrical cable capable of reliably supplying sufficient electric power to drive the electric motor(s) and other components or a separate retrieval cable and electric conduit where the electrical conduit is attached to or disposed in the casing pipe wall. In some embodiments, an electric motor(s) is combined with a bi-directional mud motor(s).

In some embodiments, the casing is a combination drill pipe and casing (referred to herein as a drill-casing) in which the drill-casing pipe array is rotated to rotate the drill bit, in combination with the downhole drive motors additionally driving the drill bit. In some embodiments, the drill-casing pipe array is not rotated, or rotated insignificantly in relation to drilling speed, and the downhole drive motor(s) are fully or primarily responsible for driving the drill bit. In some embodiments, the drill pipe is separate from the casing and is rotated to drive the drill bit, in combination with the downhole drive motors additionally driving the drillbit.

In some embodiments, composite polymer drill-casing pipe is preferred for attaching electrical connections because the wiring can be incorporated in the wrapping during manufacture and electrical connection between pipe joint are more easily facilitated.

Various embodiments, including those using a central retrieval-electrical conduit cable, can use drill-casing that is capable of driving a drill bit in both clockwise and counterclockwise directions (bi-rotational). Such drill-casings have properties and design characteristics that allow a bi-rotational connection to a bottom hole assembly (BHA), including a drilling device, configured to allow the BHA to be repaired, replaced or modified without removing any of the drill-casing pipe array.

The embodiments of this invention increase the efficiency or the drilling of wells, particularly oil and gas wells, and decrease their cost by using a single combination drill/casing pipe system designed to provide all the functions necessary to drill, protect and prepare a well for its intended purpose, in the use of dual drilling motors, and in the extension of drill bit life by bi-direction drilling.

BRIEF DESCRIPTION OF THE DRAWINGS

Various embodiments of the present embodiments are described with reference to the following figures Like reference numerals therein refer to like parts throughout the various views unless otherwise specified. Embodiments and portions of embodiments illustrated and described herein are non-limiting and non-exhaustive, unless otherwise specified.

A more complete understanding of the method and apparatus of the present invention may be had by reference to the following detailed description when taken in conjunction with the accompanying drawings, wherein.

Figure 1A:
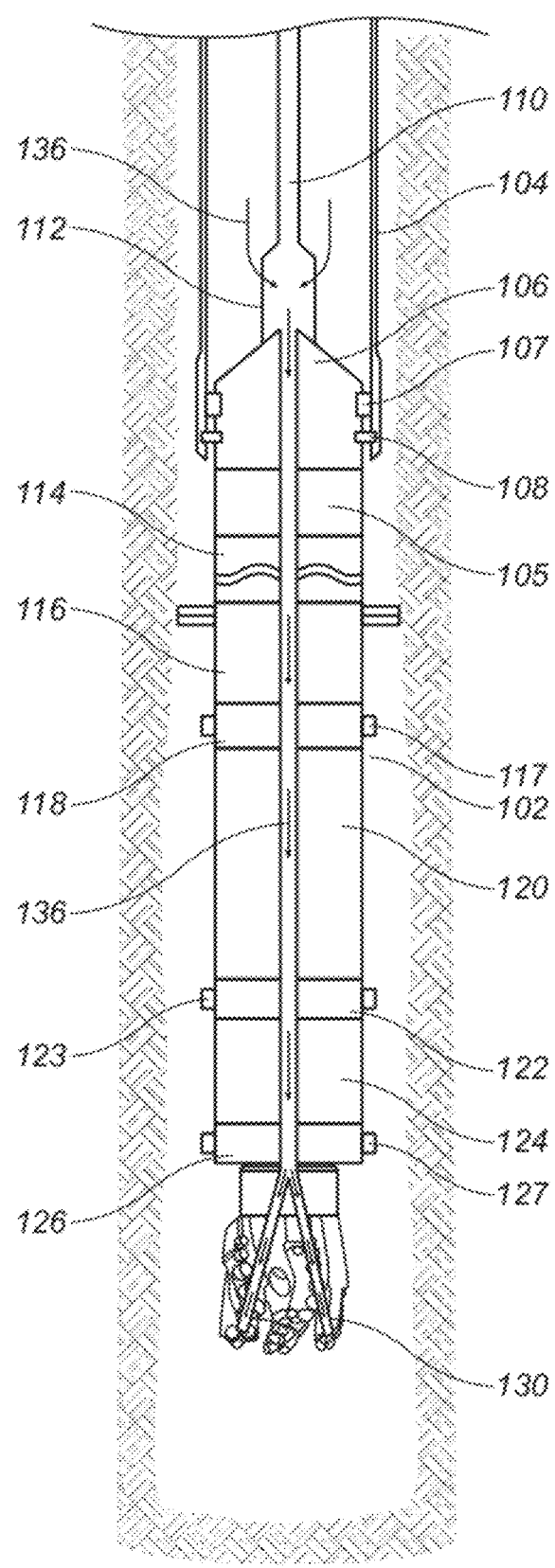
FIG. 1A is a plan elevation view of an assembly of an embodiment of the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

In the following detailed description, reference is made to the accompanying drawings that form a part hereof, and in which is shown, by way of illustration, specific implementations (embodiments) which may be practiced. These implementations are described in sufficient detail to enable those skilled in the art to practice the implementations, and it is to be understood that other implementations may be utilized. Further, logical, mechanical, electrical, and other changes may be made without departing from the scope of the implementations. The following detailed description is, therefore, not to be taken in a limiting sense, unless otherwise stated.

GENERAL EMBODIMENT

Embodiments disclosed herein relate to a bi-directional (as defined herein) well drilling system capable of drilling in both a clockwise (CW) and a counterclockwise (CCW) direction with approximately equal engineering properties of interest in both the CW and the CCW directions.

Embodiments of the invention comprise at least one pipe string to which is attached a bi-directional bottom hole assembly (BHA) comprising a bi-directional electric motor and a bi-directional mud motor assembly. Power is supplied to the electric motor by a retrieval-electrical cable.

Particularly preferred embodiments of the invention comprise at least one drill-casing array; a bottom hole assembly (BHA) releasably connected to the bottom of the drill-casing array and capable of sustained rotation in both the directions, comprising a bi-directional electric motor and a bi-directional mud motor assembly; and at least one cable assembly suspended inside the drill-casing and including a retrieval-electrical cable sized to supply sufficient power to the at least one electric motor to drive the drill bit. The BHA is suspended from the retrieval-electrical cable assembly such that the BHA is capable of being withdrawn from the drill-casing by the cable after releasing the connection to the drill-casing and retracting the drillbit.

Other embodiments are presented herein, and still other embodiments are encompassed within the scope of this disclosure.

DEFINITIONS

The following definitions are provided to clarify the language used herein. Various other terms, as used herein, are defined when used or are defined by the context.

Bi-Directional

As used herein, the terms 'bi-directional' and 'bi-rotational,' unless clearly intended otherwise, are equivalent, and refer to the ability to rotate effectively for drilling (or the particular purpose(s) of the object(s) in context) in both a clockwise (CW) and a counterclockwise (CCW) direction (although not actually rotating in both directions simultaneously). 'Bi-directional' and 'bi-rotational' is particularly used herein to refer to the ability of certain motors, drill bits, pipes, pipe joint connections, etc. to rotate over a period of time or revolutions reasonably effective for drilling in both the CW and CCW directions.

In contrast, many standard threaded pipe joint connections are uni-directional in that they screw together in one direction (e.g. CW), and unscrew in the other (e.g. CCW). When the pipe string is rotated for drilling in the same direction (e.g. CW), the pipe string stays connected, as any movement of the pipe joint connections is tightening; however, if drilling is attempted with the pipe string in the other direction (e.g. CCW), the pipe joint connections will begin unscrewing and begin disconnecting inside the wellbore, with disastrous consequences. Accordingly, such pipe string connections are not effective for drilling in both a CW and CCW direction. Similarly, some twist-lock connections are not designed for the extended forces of drilling in a reverse (e.g. CCW) direction.

Similarly, known mud motors are uni-directional. They are only designed and effective for driving a bottom hole assembly (BHA—e.g. a drill bit, under-reamer, etc.) for drilling by rotating the BHA in a single direction (CW or CCW). In contrast, various embodiments herein disclose bi-directional mud motor assemblies that are effective for driving a BHA for drilling by rotating the BHA in both CW and CCW directions. Bi-rotational (bi-directional) electric motors disclosed herein likewise are capable of driving a BHA in both CW and CCW directions.

Analogously, various known drill bits, under-reamers, etc. are only effective for drilling in one direction. While the drill bit may logically be capable of turning in both directions, they are only practically effective in one direction for various reasons—sharpening only on one side, orientation of inserts or teeth to cut effectively only in one direction, etc. These are, thus, treated herein just as they are considered by a reasonable person of skill in the art of well-drilling: as uni-directional. Various bi-rotational drill bits, under-reamers, etc. are provided herein that are practically effective at drilling in both CW and CCW directions. These bi-directional bits are approximately equally effective at drilling whether being driven in a CW or CCW direction.

As used herein, 'bi-directional' (or, equivalently, 'bi-rotational') infers at least that the appropriate engineering properties—such as torque, force, angular speed, motor efficiency, etc. —are either approximately equal in both directions, or are accounted for and designed around to produce a system with practically equivalent properties in both CW and CCW directions. For example, a motor may be significantly less efficient (or incapable of turning) in one direction, but gearing would be provided to balance the inefficiency in the properties of concern to the application (e.g. a reversing transmission). In preferred embodiments, the engineering properties of concern are approximately equal in both a CW and CCW direction (including efficiency, torque, and angular speed).

Approximately equal implies that while there may be differences, they are not such as will substantially impair practical operation in the field. For example, a standard pipe string is not approximately equal in both directions: although it could be said to turn in a reverse direction, it will either come apart, or must be turned with such low torque and speed to prevent uncoupling—and that only for a limited period of time before uncoupling occurs—that it cannot practically be used to drill with in a reverse direction.

In contrast, a mud motor assembly comprising a mud motor and reversing transmission may drill with somewhat greater efficiency in one direction than the other, depending largely on the design of the transmission and overall assembly, but is still practically capable of effectively drilling in both directions. Although the engineering properties may not be exactly equal in both directions, they are approximately equal for use in the field, and provide various advantages, such as are disclosed herein.

Joints

Joints, as used herein, refer to a single piece of pipe. In general, a joint can refer to a single piece (or 'stick') of pipe, or to the connection between two pieces of pipe (the point or region of joining), and may be used in either sense in various referenced publications; accordingly, the particular usage must be determined by context. For the sake of clarity herein, however, 'joint,' unless otherwise specified, is used in the first sense: a single piece of pipe (whether drill stem, casing, combination drill stem/casing referred to herein as drill-casing, etc.).

String

A string of pipe, or equivalent terms 'pipe string' and 'array,' as used herein, refers to a plurality of pipe joints which are connected together effectively for an intended purpose. For example, a drill-casing array is a plurality of drill-casing pipe joints connected together such that the assembled joints are capable of being used both in drilling and casing a well.

Drill Pipe

Drill pipe, or the equivalent term of 'drill stem,' as used herein, refers to pipe used to drill a well. Standard drill stem is typically rotated to provide at least some of the motive for a BHA attached at the end, and is typically of a smaller diameter than the intended diameter of the drilled hole (the wellbore). Some drill stem is not rotated, or is rotated only enough to prevent sticking in the wellbore due to friction and/or to aid in progressing the pipe string into the hole, but does not provide a significant amount of rotational motive for the BHA.

Casing

Casing, as used herein, is used to line a wellbore, and to prevent collapse of the various earth layers forming the wall. Traditionally, casing is inserted after drilling the well and after the drill stem is removed; however, in various embodiments, the casing also doubles as drill pipe, as referenced further herein.

Drill-Casing

Drill-casing, as used herein, refers to multi-purpose pipe used at least for both drilling the well and casing the wellbore. Various embodiments of such are detailed herein, and include drill-casing that is rotated, drill-casing that is not rotated, drill-casing that is used to provide at least some of the rotational motive for a BHA, and drill-casing that does not provide any or significant rotational motive to the BHA. Further details and variations are disclosed herein.

Retrieval-Electrical Cable

Retrieval-electrical cable, as used herein, is a multi-purpose cable that is capable of both providing electric power to and supporting the entire weight of a BHA, the BHA comprising at least one electric motor and, for drilling, comprising at least one drilling device. In various embodiments disclosed herein, the retrieval-electrical cable also provides at least one of: power to associated apparatus, one or more control signals related to operation of the BHA, and any combination thereof.

Bottom Hole Assembly

A bottom hole assembly (BHA), as used herein, refers to the assembly of devices, etc. that are used in the bottom of a well. Typically, during drilling of a well, a BHA comprises a drill bit (or other drilling device) as the lowermost major component. A BHA may be alternatively referred to herein as a 'down hole assembly.'

Drilling Device

A drilling device, as used herein, refers to an apparatus used to penetrate the earth to forma wellbore. A drilling device is typically represented herein by a drill bit. Some drill bits may specifically be under-reamers, or similar type expandable and retractable drilling devices.

Further, as used herein, a single "drilling device" may actually comprise several drilling devices—such as a drilling device comprising a pilot bit and an expandable reamer, which is particularly advantageous when using drill-casing.

Under-Reamer

An under-reamer, as used herein, is an expandable and retractable drill bit. It is advantageously used for lowering through the bore of a pipe string, and then expanding at least radially to drill a hole of larger diameter than the diameter of the pipe string's bore. The under-reamer is also capable of being retracted at least radially so that it may be withdrawn through the bore of the pipe string again. Commercially available reamers include the GaugePro XPR expandable reamer by Hughes Christensen (an assembly including a pilot drill bit), the Extreamer™ by Paradigm Group B.V., and the Rhino XS2 Full-Cycle Expandable Reamer by Schlumberger.

Substantially Permanently Connected

Substantially permanently connected, as used herein, refers to the property of a connection between pipe joints, wherein the connection does not separate during rotation, during simple pushing or pulling, or during normal use. In particular, substantially permanent connections, as used herein, are inherently bi-rotational: they do not normally disconnect when a pipe string so connected is used to drill in a CW direction, a CCW direction, or both. A substantially permanent connection may be fully permanent in the sense that pipe joints so connected must be destructively separated, such as welded connections, but need not beso.

Various connections disclosed herein are substantially permanent in that they are bi-rotational, and do not come apart during normal rotation in both CW and CCW directions, lifting the pipe string axially, driving the pipe string into a wellbore, etc., yet still are designed to be separated non-destructively, such as by removal of a pin, disengagement of a locking mechanism, etc. Various embodiments herein comprise substantially permanent connections between pipe joints that are not welded or otherwise fully permanent.

In contrast, a normal threaded connection, as well as some twist-lock connections, etc., is not substantially permanently connected in that the connection is separable by reversing the direction of rotation, by reversing the direction of rotation and then pulling, etc. A substantially permanent connection comprises at least one positive lock, such as a pawl, a pin, a cam, a key, a weld, an adhesive, an interlocking geometry, etc, that must be removed, disengaged, or destroyed in order to unscrew or pull apart the connected joints.

Gyro-Locked

Gyro-locked, as used herein, refers to the prevention of relative rotation. A gyro-locked connection between two pipe joints prevents rotation of one pipe joint relative to the other, within reasonable tolerances for the given application. Accordingly, a gyro-locked connection between two pipe joints is a preferred property of bi-rotational pipe arrays.

Fluidly-Sealed

Fluidly-sealed, as used herein, refers to the prevention of fluid from entering or exiting a given object. For example, a fluidly sealed connection between two pipe joints means that, within reasonable tolerances, fluids of interest do not intrude into the pipe string through the joint, and do not escape out of the pipe string through the joint.

A fluidly-sealed connection may be so in relation to fluids of interest—for example, drilling mud—or may be generally so—being sealed at least against all fluids expected to be normally encountered in a given application. For example, a drill string may have connections which are fluidly sealed against drilling mud, petroleum, etc., but are not necessarily air-tight, such as in drill-strings that need only to contain drilling mud but do not need to contain air or other gases. In contrast, gas drilling strings will need to be fluidly-sealed against gases as well. The application will determine the extent to which a connection is fluidly sealed.

Major Components

In various embodiments, the system disclosed herein comprises at least:

(a) a pipe array,
(b) a bottom hole assembly, and
(c) an electrical cable.

Pipe Array

Pipe arrays herein comprise a plurality of pipe joints secured together, as applicable. In some embodiments, at least two types of pipe arrays are used: drill pipe and casing. In some embodiments, a single type of pipe array is used: drill-casing. It is an important aspect of embodiments of the invention that joints of drill-casing pipe be substantially permanently connected, being gyro-locked such that they cannot rotationally uncouple. In other words, they are bi-rotational (also referred to herein as bi-directional), because they are capable of being operated for drilling in a CW and CCW direction without uncoupling.

Thus, the pipe string comprises multiple pipe joints connected together with gyro-locked connections to enable them to be rotationally driven in both a clockwise and counterclockwise direction without coming uncoupled due to rotation associated with drilling. The joined pipe string is designed to withstand the operational forces of tension, compression, torsion, bursting, collapse and flexing that are expected to be required or encountered in its operation, to protect the drilled hole, and to provide a passageway for both circuits for command, control, and data transmission and circuits for electrical power to the down hole devices contained in the BHA.

In some embodiments, the drill-casing is rotated to rotate the drilling device(s), preferably in combination with downhole drive motors. In particularly preferred such embodiments, the drill-casing is rotated at a base speed, while the primary rotational power of the drilling device(s) is supplied by the downhole drive motors, such that the speed of the drilling device(s) is primarily governed by the downhole drive motors. In some embodiments, the drill-casing is not rotated at all, while in some the drill-casing is only rotated to prevent or minimize sticking of the drill-casing to the wellbore wall.

Various embodiments of the system using drill-casing use a single drill-casing string of pipe that is connected to a BHA that comprises a drilling device. The BHA is capable of being rotated (and, in some embodiments comprising components capable of driving rotation), effective for drilling, in both CW and CCW directions (bi-rotational). The system and drill-casing have properties and design characteristics that allow a connected BHA, particularly the drilling device(s), to be repaired, replaced or modified without removing any of the single drill-casing pipe string. This system works best with a central retrieval cable. In preferred embodiments, the central retrieval cable has electrical conduits therewith sufficient to drive the electric motor(s) driving the drilling device, forming a central retrieval-electrical cable.

Bi-Rotational Pipe String with Bi-Rotational Sleeve Couplers

Some embodiments encompass a system using bi-rotational pipe joints and couplers as described in U.S. Pat. No. 9,995,089, issued Jun. 12, 2018 and incorporated herein by reference.

The system includes a rotatable sleeve disposed on the end of one pipe joint and a guide on the other pipe joint in which both sleeve and guide have mating threads to pull the joint together and pipe end structures to prevent rotation when the joints are pulled together.

Various preferred embodiments of the above system encompass a coupling system capable of rotation in a CW and CCW direction without decoupling, the system comprising a drill (or drill-casing) pipe with an end having an end structure comprising an elongated cylindrical sleeve open at one end and partially closed at the other end, the closed end having an opening sized to allow a section of drill pipe to pass through and having screw threads located at about mid-point on the inside diameter surface. The coupling system further comprises another drill pipe with an end having a cylindrical guide structure surrounding and attached to the end of this second drill pipe, the sleeve having screw threads located at about mid-point located on the outside diameter surface of the cylindrical guide structure and a recess for a seal at a point above the screw threads. The first drill pipe sleeve has an internal diameter sized to fit over the cylindrical guide structure of the second pipe structure, and the distal end edges of the first and second drill pipes both have end edges that are geometrically profiled (such as sloped, saw tooth shaped or curved end sections) and configured so that the edges of both pipes are mated when the ends are abutted together.

Clamshell Pipe Joints

In various embodiments herein, clamshell pipe joints are provided, examples of which are illustrated in FIGS. 6A-6D. Such clamshell pipes are particularly advantageous when using a central retrieval cable, a central electrical cable, or other cable in the interior of the pipe. Instead of feeding the cable through the pipe when adding a pipe joint to a pipe array, a clamshell pipe joint is simply opened (or comes pre-opened), and then is put in place and closed around the cable. In various embodiments, the connection of the new pipe joint to previous pipe joints can be made subsequently to or simultaneously with closing around the cable.

In some embodiments, the connection between two pipe joints is made with an opening connector, such as a clamshell, a two-piece (or multi-piece) connector that is assembled around the connection between the two pipe joints, or other suitable connector. In some embodiments, the connection is integral with the pipe, and may be an interlocking connector, a snap-type connector, a connection disclosed elsewhere herein, etc. In some embodiments, adhesive is used either in place of or in addition to mechanical connection between two pipe joints.

In various embodiments the seam along the pipe, formed when the clamshell pipe joint closes, is secured by a mechanical lock or latch. In some embodiments, the seam is sealed, at least partially, by adhesive along the length of the seam. In some embodiments, at least one flexible bead, such as a rubber or elastomer gasket, is embedded along the length of the seam to seal the seam, at least partially.

In preferred embodiments using clamshell pipe joints, the clamshell pipe joints are composite polymer. In some such embodiments, control and logging conduits are interwoven in the pipe joints, and a central retrieval-electrical cable runs through the center of the pipe. The control and logging conduits are automatically connected as the pipe joints are connected together. In some such embodiments adhesive, such as epoxy, solvent (to create a self-adhesive bond wherein the pipe joint edges are dissolved and reform in a unitary structure), a pressure activated adhesive, etc., secures and seals the seam, at least in cooperation with mechanical components such as discussed herein.

In some embodiments using adhesive, the adhesive is applied manually or by a machine to the pipe seam edges in the field. In some embodiments, the adhesive is pre-applied. Various such embodiments include at least one of: pressure sensitive adhesive that activates upon the seam being closed (in some such embodiments, a seam-closing apparatus is used to temporarily increase the pressure along the seam either along the whole length simultaneously or progressively in order to activate the adhesive), a two-part epoxy wherein one part is along one edge and one part is along another edge (in some such embodiments, an interlocking groove and tongue is on each edge, and one part is in one groove while the other part is in the other groove), an air activated adhesive wherein a temporary seal (such as a tape strip) is removed in order to begin activating the adhesive, and other suitable means.

In some embodiments with clamshell pipe joints, the two seam edges are provided with interlocking geometry, such as that of the examples illustrated in FIGS. 6A-6D. Some such embodiments have geometries comprising at least one of: scallops, waves (such as a sinusoidal profile, or such as the profile of seam 604 in FIG. 6D), teeth (such as triangular projections, such as the profile of seam 604 in FIG. 6C), rectangular projections (such as the profile of right edge 602, left edge 603, and seam 604 in FIGS. 6A and 6B), and polygonal projections. Such embodiments are advantageous at least in mechanically preventing excessive shear stress on the seam due to torsion as the pipe is rotated. In some embodiments having patterned interlocking seam geometry, at least one portion of the seam is of a different geometry than that of the rest of the seam in order to 'key' the seam to ensure that the seam is properly aligned axially. In some such embodiments the key component(s) is at least one of: simply one piece of the pattern of an exaggerated size, a different shape (such as key 605 in FIG. 6C), a non-patterned or different-patterned length of the seam, or other suitable key.

FIGS. 6A-6D illustrate specific embodiments of pipe 600 with hinge 601 (in various embodiments the hinge is a living hinge, a sealing piano-type hinge, or other suitable hinge mechanisms; in some embodiments no hinge is provided, and substantially the entire circumference of the pipe flexes when the pipe is opened. Right edge 602 and left edge 603, with complementary geometric profiles, joint together to form seam 604. In some embodiments, edges (and the resulting seams) are provided with at least one key 605.

Bottom Hole Assembly

The bottom hole assembly (BHA) comprises apparatus for drilling, repair, exploration, production, etc., as needed. It is attached to the bottom of the pipe string, whether an array of drill pipe, an array of casing pipe, or an array of drill-casing pipe.

During drilling, the BHA typically comprises at least one drilling device. In preferred embodiments herein, it also comprises at least one electric motor. In particularly preferred embodiments, a BHA for drilling comprises at least one of each of the following: a bi-rotational electric motor, a bi-rotational mud motor assembly comprising at least one mud motor and at least one reversing transmission, and a bi-rotational drilling device. The bi-rotational drilling device in typical such embodiments comprises a bi-rotational under-reamer and pilot bit.

All BHA for drilling in embodiments encompassed by this invention are bi-directional, being capable of drilling in both a CW and CCW direction. The BHA comprises at least one bi-directional electric motor. In preferred embodiments, the BHA further comprises at least one bi-directional mud motor assembly. The BHA, in various embodiments, further or alternatively comprises ancillary device(s) as desired. The BHA also, in some embodiments, includes at leas one of the following (or a down hole component(s) thereof): locating device, steering device, logging device, sub, other attendant devices, and combinations thereof.

Attachment to Pipe String

In preferred embodiments herein, the BHA also comprises a releasable top attachment mechanism (RTAM), which releasably attaches the BHA to the bottom of the pipe string. In use of some such embodiments, the BHA is lowered by a surface-operated central retrieval cable into a receiving and seating device (RSD) contained at the lower end of the pipe string. In such embodiments, the BHA is wire-line retrievable, being capable of being released from the RSD, being thereby released from the bottom of the pipe string, and then being retrieved out of the well through the bore of the pipe string to the surface.

In particularly preferred embodiments, the RTAM comprises an electrically or hydraulically-actuated latching mechanism (comprising, for example, cams, dogs, pins, twist-lock grooves or bosses, etc.). The RTAM is capable of being released from the surface in order to allow retrieval of the BHA without removal of the pipe string. In some embodiments, actuating the RTAM to release it withdraws at least one pin, cam, dog, etc, and actuating it to engage it does the opposite. In some embodiments, the RTAM comprises an actuator that twists the BHA within the pipe to engage a twist-lock feature (such as ramped bosses and/or grooves that interlock with ramped bosses and/or grooves in the RTAM), with a pin, cam, etc. preventing the BHA from releasing, despite rotation in CW and CCW directions, until release is commanded and the pin, cam, etc. is withdrawn.

In some embodiments, the BHA is attached to the end of the pipe string with a bi-directional coupling sleeve, such as is discussed elsewhere herein. In some embodiments, the BHA is attached within the pipe string. In some embodiments, the end of the pipe string simply has a pattern (such as waves, grooves, teeth, etc.), and the BHA has at least one expanding feature (such as an expanding collar) that expands outwards to engage the pattern on the end of the pipe string and prevent both rotation of the BHA attachment relative to the pipe, and withdrawal of the BHA into the wellbore, while the retrieval cable is tensioned to keep the BHA suitably tight against the end of the pipe. In some such embodiments, at least some of the expanding feature(s) positively engage a complimenting feature(s) in the pipe string to prevent rotation and upward and downward travel, eliminating the need for the retrieval cable to remain tensioned.

Electric Motors

As stated, all BHA of embodiments of this invention for drilling comprise at least one bi-directional electric motor for driving at least one drilling device. In some embodiments, only one electric motor is provided. In some embodiments, multiple electric motors are joined end to end to, as needed, to granularly control the amount of torque, speed, etc. available to the drilling device.

Electric motors used herein are any suitable electric motors, as needed based on location, horsepower required, environmental protection required, torque and speed required, etc. Some embodiments (such as in wells with gas potentially present) require explosion-proof electric motors. Preferred embodiments are provided with totally-enclosed, fluidly-sealed motors. Some embodiments are provided with alternating-current (AC) electric motors, which have an advantage in more efficient transmission of power over longer electric power conduit cables. Some embodiments are provided with direct-current (DC) electric motors, which can offer an advantage in portability of power (such as with batteries). Some embodiments are provided with servo motors, either AC or DC, which offer an advantage in fine control of speed and direction. Selecting suitable motors for a given application is within the capability of those of ordinary skill in the art of electric motors and power transmission.

In some embodiments, such as some utilizing DC motors, changing the direction of rotation of the electric drilling motor is simply a reversal in the polarity of the supplied electric power. In some embodiments utilizing three-phase AC motors, direction is reversed by reversing two of the three phases. In some embodiments, changing the direction of rotation of the electric drilling motor is accomplished by utilizing a pre-configured bi-directional motor with a separate forward/reverse signal. Other suitable methods are within the capabilities of those of ordinary skill in the art of electric motors.

Mud Motors

Various embodiments herein are provided with a BHA comprising at least one mud motor. A mud motor is a hydraulically-driven progressive-cavity positive-displacement (PCPD) pump, placed in the drill string and driven by pumping drilling mud through the mud motor, causing eccentric motion in the power section of the motor, which is converted by the 'screw' (e.g. helical) rotor into concentric power to the output shaft or mechanism. As mentioned, mud motors are advantageous in drilling at least because they utilize energy for driving the drilling device from the drilling mud already being pumped past the BHA in order to cool the drilling device, remove drilling debris, etc.

Mud motors, by their nature, turn in one direction only, at least when drilling mud is being pumped downward from the surface (some mud motors will turn backwards when mud backflows through the motor towards the surface). Accordingly, in order to provide a bi-rotational mud motor assembly, mud motors used in BHA herein are provided with a reversing transmission, discussed elsewhere herein. The mud motor(s) and reversing transmission(s) together form a mud-motor assembly(ies) which is bi-directional, being capable of driving a drilling device in both a CW and CCW direction.

More than one mud motor may be coupled axially (end-to-end) in order to provide the power output required. Commercial mud motors are available from companies such as Schlumberger, Hunting, and IDS (Accu-Dril™ mud motors). Selection of a suitable mud motor(s) for a given application is within the capabilities of those of ordinary skill in the art of well drilling.

Synergism of Electric Motor and Mud Motor

In preferred embodiments, as stated elsewhere herein, a BHA comprises a combination of at least one electric motor and at least one mud motor. The combination of a mud motor and electric motor is synergistic, and dresses weaknesses associated with each type of motor, while exploiting the advantages of each type.

The electric motor provides better control of angular speed, and smoother rotation than relying solely on a mud motor and/or than drilling solely with pipe stem rotated at the surface of the wellbore. The electric motor provides the opportunity for more direct control of the speed of the drilling device than either a mud motor or pipe string rotation. The electric motor also provides the ability to keep the drilling device rotating during addition of a pipe joint to the drill string, etc., regardless of whether drilling mud is being circulated.

In some such embodiments, the drilling device is rotated at a significantly reduced speed by the electric motor while a pipe joint is being added (i.e., while forward pressure to the pipe string is typically not being applied, and drilling mud is typically not being circulated) in order to keep the drilling device from seizing up or becoming stuck, and to prevent debris from lodging in a way that may lock or damage the drilling device. However, the drilling device is not rotated at full speed, at least to prevent damage to the drilling device due to overheating because of reduced or no drilling mud and light to no tooth load. Tooth load is inversely related to speed and directly related to forward drilling force (the approximately axial force urging the drilling device in the direction the wellbore should be drilled), but the reduced speed does not damage the drilling device from an increased tooth load because the forward drilling force is reduced or eliminated at the surface.

The mud motor provides efficient power by utilizing already circulated drilling mud. A relatively robust and elegantly simple design, it augments the power of the electric motor, reducing the power needed to run the electric motor and, thus, the size and weight of the cable required for the electric motor. The electric motor augments the power of the mud motor, addressing the difficulty of providing sufficient power to a drilling device solely with a mud motor. Together, the electric-mud motor combination provides the system with a higher level of control of speed and power to the drilling device. In some embodiments, smaller motors can be used, utilizing only the mud motor, only the electric motor, or both.

The motors used in such embodiments will depend on the circumstances in the field, such as the geological formation(s) being drilled through, the current drilling stage, current well depth and orientation, whether drilling mud is being pumped, the power required to turn the drilling device, the size of the drilling device, the speed of penetration required, etc. The combination of electric and mud motor also provides a more reliable shape to the hole than just a mud motor or turning pipe string, at least by better control of rotational speed, while preserving the efficiency and robustness of the mud motor.

Assembly

Although various embodiments will arrange the motor(s) used in the BHA in various ways, depending on the particular application, exemplary embodiments are presented herein for illustrated purposes.

Shared-Shaft BHA Assembly

In some embodiments, a single shaft is provided which is driven by multiple motors, while in some embodiments, a plurality of motors, in a similar fashion as with a single shaft, share a shaft. In some embodiments with a single (or shared) shaft, at least one of the motors after the uppermost (closest to the surface in the BHA) drives the shaft via a bi-directional overrunning clutch that allows the shaft to slip in one direction at a given time when the operationally-connected motor is not turning or not turning fast enough, and engages when the shaft is turning slower than that motor. A vertical hollow shaft motor with an overrunning clutch fitted inside the hollow shaft, and a solid shaft passing through the overrunning clutch is used in some such embodiments.

In some embodiments with a single shaft, sensors provide feedback on the speed of the shaft, and motors are operated according to the desired speed and current speed. Such embodiments are particularly useful with electric motors which can be driven at relatively precise speeds more efficiently. Embodiments with overrunning clutches are provided with a means of changing the direction of the clutch when the direction of drilling is changed (e.g. from CW to CCW, or CCW to CW).

In preferred embodiments, the motors are daisy-chained: the output of one motor drives the input of the next motor down. Various commercially available and custom mounts, adapters, etc. are available and within the capabilities of those of ordinary skill in the art.

Daisy-Chained BHA Assembly

In particularly preferred such embodiments, the BHA comprises, in the order presented:
1) a bi-directional connector by which the BHA is attached to the bottom of the pipe-string,
2) at least one bi-directional electric motor,
3) at least one bi-directional mud motor assembly comprising at least one mud motor and a reversing transmission, the mud motor assembly being mounted to the output shaft (or other suitable output mechanism) of the electric motor(s), and
4) a drilling device, such as an under-reamer.
Other components may be included between, above, below, or with (or combinations thereof) the four recited components, as desired.

Embodiments with such a BHA are particularly preferred because of the synergy of the electric motor(s) and mud motor(s), as discussed herein, and in order to separate the electric motor(s) as far as reasonable from the drilling mud exiting the mud pump and flowing over the drilling device. Furthermore, the power cable for the electric motor(s) does not have to pass through or around the mud motor. Such embodiments are provided with channels around the electric motor that allow passage of the drilling mud from the bore of the pipe string to flow around the electric motor and into the mud motor. In these embodiments, the mud motor assembly is not placed above the electric motor.

In preferred daisy-chained embodiments, and in various other embodiments herein, the electric motor(s) do not require the mud motor(s) to run. In other words, the electric motor may run with or without the mud motor running. In particularly preferred embodiments (daisy-chained or otherwise), the electric motor(s) and mud motor(s) can provide rotational motive independently of each other: either the electric motor may run or the mud motor may run, as desired. In some daisy-chained embodiments, when a motor is not running, it simply acts as a connector: it does not provide motive power, but it does not free-spin. In such embodiments, for example, if the electric motor(s) is not providing rotational motive, the rotor and stator (or at least the input and output connections or shafts) lock relative to each other (e.g. by electric power, by a mechanical lock, by a clutch, etc.), and the mud motor(s) can provide rotational motive to the drilling device. Conversely, if the mud motor(s) is not turning, the rotor locks relative to the housing (or at least the input and output connections or shafts do so), and the electric motor(s) can provide rotational motive to the drilling device.

Mud Motor Before Electric Motor BHA Assembly

In some embodiments, however, the order may be switched, and the electric motor is provided with a housing capable of withstanding the abrasion of drilling mud such that the drilling mud exits the mud motor, flows over the electric motor, and flows over the drilling device. The power cable passes around the exterior of the mud motor assembly (or is at least partially integrated into the wall, or has conduits through a non-rotating portion of the mud motor assembly(ies)), and connects to the electric motor. In both arrangements, the drilling mud serves to cool the electric motor(s), thereby allowing it to operate more efficiently and extend its serviceable lifetime.

Angular Speed Amplification

In various embodiments, multiple source of rotational motive combine to amplify the speed of each one. Preferred embodiments comprise a daisy-chained BHA. In angular-speed-amplified embodiments, the pipe string (drill pipe or drill-casing) is rotated at a base speed, as discussed elsewhere herein. The BHA is attached to the pipe string such that the BHA is being turned by the pipe array. The BHA comprises at least one motor that turns the drilling device. The actual angular speed of the drilling device is then the sum of the angular speed of the pipe string and the motor(s), as represented by Equation 1, where $S_D$ is the angular speed of the drilling device in rpm, $S_P$ is the angular speed of the pipe string in rpm, and $S_M$ is the angular speed of the motor in rpm relative to the angular speed of the pipe string (i.e. the speed the motor would be rotating if the pipe string was not rotating).

$$S_D = S_P + S_M \quad \text{Equation 1.}$$

When multiple motors are used, $S_M$ is the sum of the angular speed contribution of each motor (i.e. relative to the angular speed of the previous component in the chain). For example, if a pipe string is being turned at five (5) rpm, and a daisy-chained BHA is attached with an electric motor turning an additional fifteen (15) rpm, and with a mud motor which is turning at an additional ten (10) rpm, the angular speed of the drilling device is 5+15+10=thirty (30) rpm.

Such embodiments are particularly advantageous because they amplify the potential speed at which the drilling device can be run. Although the torque which must be applied by each motor in the chain is likewise amplified, relatively lower-speed higher-torque motors can be used, and daisy-chained to result in a higher drilling speed than otherwise possible.

Drilling Devices

Various drilling devices are used in system and method embodiments herein, including roller bits, tri-cone roller bits, diamond impregnated drilling devices, polycrystalline diamond (PCD) drill bits and drilling devices, and polycrystalline diamond compact (PDC) drill bits and drilling devices.

In embodiments herein utilizing progressive drilling, a roller bit (including a—drill bit) is only used for the upper segments of the well. In some such embodiments, a roller bit is only used when the wellbore diameter is greater than or equal to seventeen (17) inches. In some embodiments, a roller bit is only used in the first diameter drilled.

Electrical Cable

The electrical drilling motor(s) of present embodiments is powered through a continuous (in preferred embodiments, continuous through connections) insulated cable that is also, in some embodiments, used to run in and withdraw the drilling assembly (a retrieval-electrical cable).

As is described, the present invention comprises methods and apparatus for utilizing a downhole electric motor or motors for drilling in a well, and potentially at the end of a drill-casing, with a combination retrieval and electrical conduit cable capable of reliably supplying sufficient electric power to drive the electric motor(s) and, in some embodiments, supplying power to other downhole components. The combination cable is, in some embodiments, a retrieval cable with electrical conduits included. In some embodiments, the power cable is not a retrieval cable, but is an electrical conduit disposed in or attached to the casing.

The effective use of electric drill motors is hereby enabled by means to ensure adequate continuous electric power by providing either electrical lines attached to the drill string of by a suitable cable system. Particular cables, and connections thereof, are discussed elsewhere herein.

In various embodiments, the cable is coiled on a mandrel at the surface, or otherwise spooled at the surface. It is preferred that the cable be made into discrete sections, as for example, of about 5000 feet in length. This allows the cable to be transported as needed and reduces the weight that would be needed to be transported if the cable was one continuous string. The sections can easily be connected using efficient and reliable mechanical and electrical connectors, preferably as the end of a cable being fed down into the well is approaching. It is preferred that the section be of different sizes with the smallest diameter (and, therefore, lower weight) as the first section (which descends the deepest into the wellbore and is closest to the BHA), and subsequent sections being of increasing diameter. The principle weight that the retrieval string needs to lift is: (a) the weight of the BHA and (b) the weight of the cable itself. By sectioning the cable in graduated diameters, as described, the heavier and stronger section at the top of the string will bear the greatest weight, and the smaller lower section will reduce the overall weight of the string but be of sufficient strength to carry the load without the weight of the entire cable.

In some embodiments in which the pipe string is rotated, and using a central electrical power cable, the cable is provided with at least one rotating connection means in order to prevent twisting of the cable. In some such embodiments, a rotating connection means is provided at the BHA, at the surface, inside the pipe string, or a combination thereof. Suitable rotatable electrical connection means are known, and include conductive tracks with a conductive prong(s), tab(s), etc. running inside the conductive track to allow full and repeated rotation without tangling. Typically, one track or other rotatable conductive connection channel is provided for each individual cable, sized according to the maximum voltage and amperage required.

Drill-Casing Pipe & Retrieval-Electrical Cable

Composite polymer drill-casing pipe is preferred in some embodiments for attaching electrical connections, as the wiring can be incorporated in the wrapping during manufacture, and electrical connection between pipe joints are more easily facilitated.

For some embodiments, a surface-operated, insulated cable is designed to provide means to retrieve the drill motor(s) and/or BHA, and provide circuits for control command, data transmission and electric power to the downhole devices included in the BHA. The lower end of the drill-casing pipe contains a seating device to receive and accommodate a bi-rotational BHA that can be operated by a down hole bi-rotational hydraulic mud motor, by a downhole bi-rotational electric motor or by any combination of any of the above power sources.

In order to renew, repair or modify any part of the aforementioned drilling assembly the BHA is capable of being unlocked from the combination drill-casing pipe seating device, and be removed by the surface operated retrieval cable. The need to remove and reinstall pipe to renew, repair or modify any part of the BHA is eliminated. When the desired depth to cement the pipe is reached, the BHA is unlocked (such as by an electrically, pneumatically, or hydraulically operated latch connecting the top of the BHA to the pipe string, the latch being separate from, or integral to, the seating device on the pipe string or a seating device on the BHA) and removed by its surface operated retrieval cable, and cement is circulated into to the annular space between the wall of the drilled hole and the outside diameter of the combination pipe. Subsequently another string of smaller diameter drill-casing pipe, containing another bottom hole seating device to receive another desired BHA (which in some embodiments comprises some or all of the components from the previous BHA), is lowered into the previously cased larger hole and a new smaller hole is continued to be drilled to a next desired depth, as above, and then the smaller diameter string of combination drill-casing pipe is cemented into place. This process continues to the total desired depth with decreasing diameter pipe strings, and the final string of combination drill-casing pipe is cemented in place.

Figure 1B:
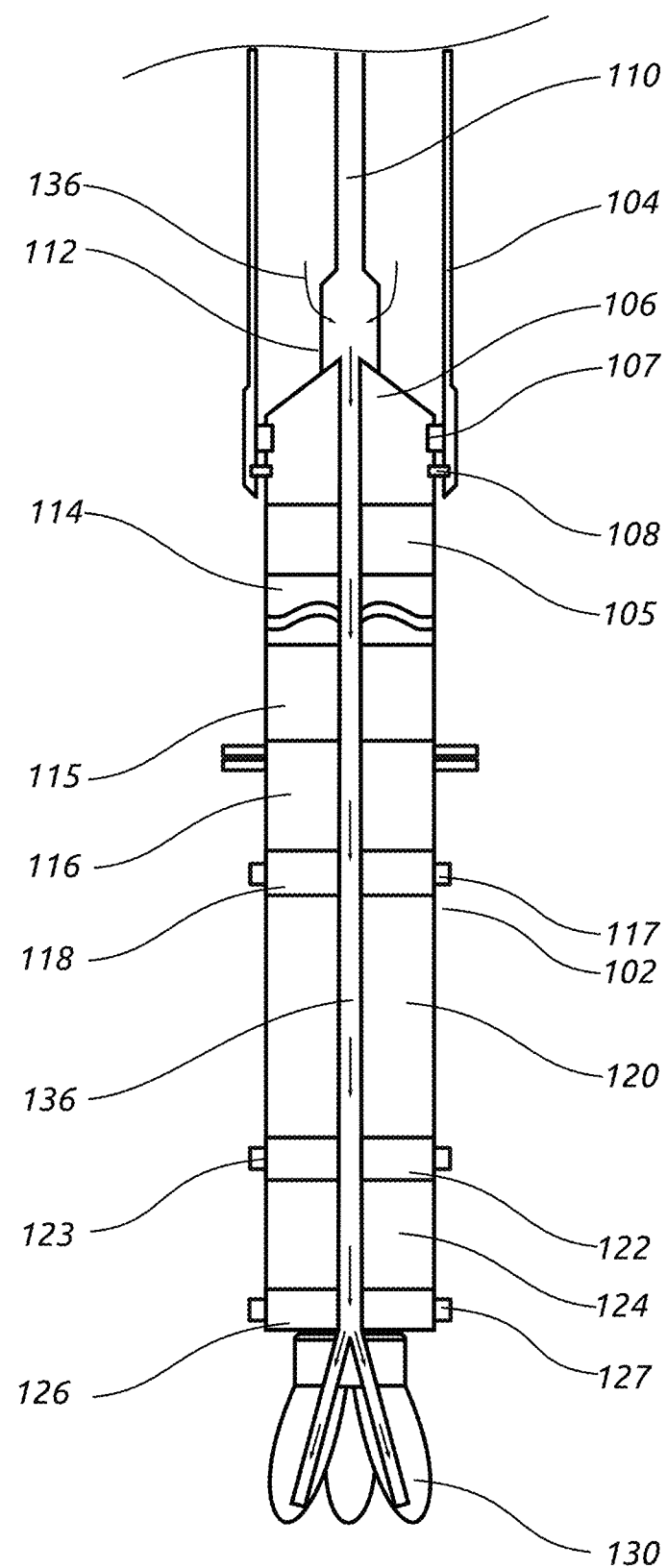
FIG. 1B is a plan elevation view of a partial section of an assembly of an embodiment of the invention.

Referring to the drawings, FIG. 1A and FIG. 1B are schematics of the components of an embodiment of the invention. It is representative and not necessarily to scale. In the figure, 104 is the casing pipe, 110 is the insulated cable that is used to suspend the BHA, 102, and to pull the electric motor(s) and/or the BHA out of the hole. Thus, the drill pipe is drill-casing pipe, and is not removed as in customary drilling with rotating drill pipe, but once inserted in place, remains in place. The item 105 is the electric drill motor and 114 is a second motor, preferably a mud-motor.

In some embodiments, these two motors comprise a dual motor system and are bi-directional, being effective for driving rotation of at least one drilling device or other tool in both directions: CW and CCW. In some embodiments, such as that represented in FIG. 1B, a mud-motor assembly comprises mud motor 114, and reversing transmission 115.

In embodiments represented by FIG. 1, the casing pipe is connected to the BHA by a locking pin 108 and supported with a spacer 107. Mud 136 is passed down through an annular space in the component 112, which is an electrically operated connector to connect the BHA to the retrieval cable, and thus connects the cable to the top 106 of the BHA and on to the drill bit 130. Connector 112 also has means to connect the electrical power conduit(s) in the retrieval-electrical cable or the cable disposed in or on a casing pipe string. The drill bit is bi-directional, having cutting teeth in opposite directions to allow drilling in both directions—CW and CCW. Item 120 represents measuring and logging systems and items 126/127, 122/123, and 117/118 are a stabilizer. Component 124 is a rotary steering system for slant drilling. An expandable reamer 116 is activated on demand to enlarge the diameter of the hole to allow casing to be advanced.

Figure 4A:
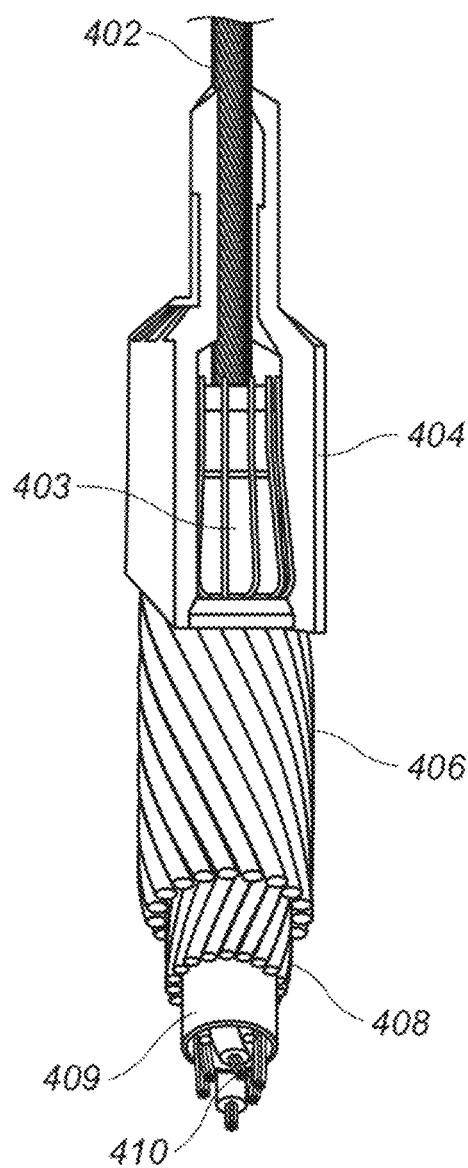
FIG. 4A is a plan elevation side view of an embodiment of the invention showing command, control, data transmission and electrical power connections in a retrieval-electrical cable.
Figure 4B:
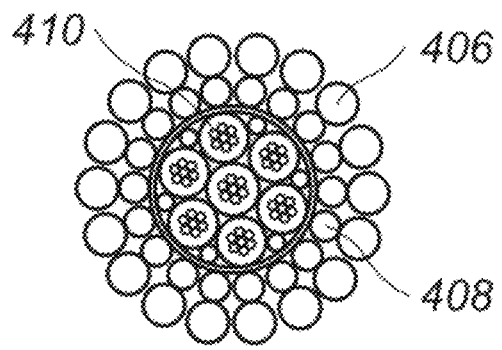
FIG. 4B is a plan elevation top view of an embodiment of the invention showing command, control, data transmission and electrical power connections in a retrieval-electrical cable.

The retrieval cable is a retrieval-electrical cable and in various embodiments comprises one or more electrical lines (410 in FIG. 4), lines for control of the motors, valves, latches and the like, and lines for transmittal of logging and other collected data. FIG. 4A and FIG. 4B are drawings of a commercial retrieval-electrical cable useful for BHA retrieval embodiments of the invention. The cable comprises at least outer layer 406 and inner layer 408, both of which are attached to head 404 via connector 403. Strands of electrical cable 410 encased in sheathing 409 are disposed inside the center of the cable bundle. Item 402 is the cable head wire-line.

The representation of components in FIG. 1 is applicable to embodiments in which electrical power is supplied by a central cable that is used to retrieve and return the motor and/or BHA out of the hole as each joint of drill-casing is added, as well as to embodiments where power lines are encased in or attached to the drill-casing pipe and electrical connection between power line sections are completed as each pipe joint is added and connected to the pipe string. The wireline cable retrieval embodiments require more labor and handling but is a robust and rugged system that ensures good electrical connection. The embodiments that provide electrical connection in or attached to the pipe string are possible because of the advance in technology and polymer pipe science and provide considerable efficiencies in not having to connect and disconnect power cables.

Composite Drill-Casing Pipe with Integrated Cables

Cast composite polymer pipe is well suited for some of the embodiments having a drill-casing pipe, especially in some embodiments having electric power lines, control lines, logging lines, or combinations thereof integrated into the polymer pipe wall. In some embodiments, metal pipe is alternatively or additionally used with attached electrical conduit lines. A very suitable composite polymer pipe is available from Advanced Composite Products &Technology, Inc. Such pipe is comprised of materials made of carbon fiber and epoxy resin. The mechanical properties are comparable to steel at less than half the weight. Composite polymer pipe is discussed in an article by Gary L. Covatch and James Heard, *Composite Drill Pipe Perfect Fit for Short-Radius Drilling,* in the American Oil & Gas Reporter. Use of these advanced tubulars are disclosed in U.S. Pat. Nos. 8,123,888 and 7,604,949 and other issued patents. The disclosures of these two patents are incorporated herein by reference.

Pipe Joint Connections

The problem with the use of electrical conduits attached to or inserted into polymer pipe has been in making secure and permanent electrical connections between pipe joints. The present invention presents solutions to that difficulty of connecting and disconnecting pipe.

Polymer composite drill and casing tubulars (pipes) with electrical wiring woven into the fiber wound walls is well-suited for some embodiments herein. See, for example, *Composite Drill Pipe Research Planned* (published Oct. 25, 1999 in the Oil & Gas Journal, available at: www.ogj.com/articles/print/volume-97/is sue-43/in-this-is sue/drilling/composite-drill-pipe-research-planned.html)—"The US Department of Energy selected Advanced Composite Products &Technology Inc. (ACPT), Huntington Beach, Calif., to head a team to develop a 'smart drilling system.' The 5.5-in. drill pipe would be made from a carbon fiber-epoxy resin similar to the material used in golf-club shafts. High-speed data communications capabilities would be woven into the composite material to transmit drilling information." Such pipes are ideal for embodiments of this invention.

Figure 2A:
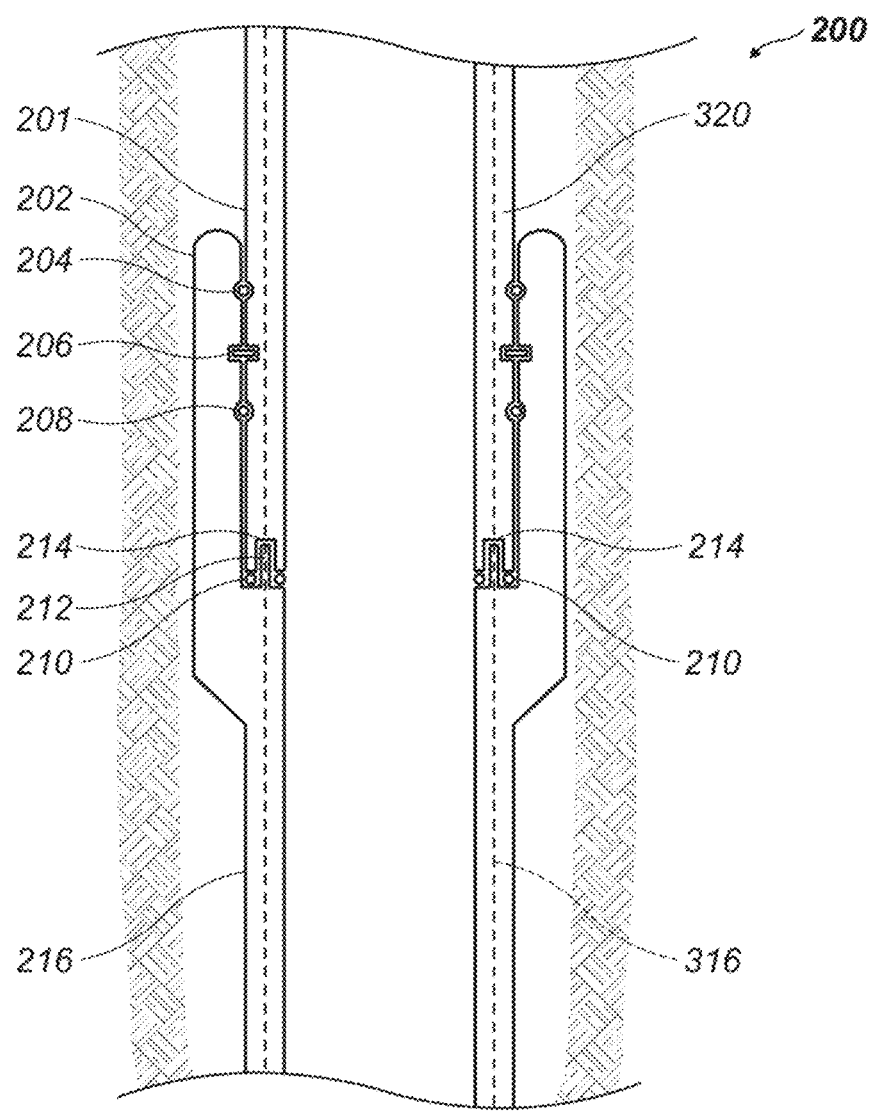
FIG. 2A is a plan elevation side view of an embodiment of the invention showing a pipe connection for pipe with electrical connections and snap ring.
Figure 2B:
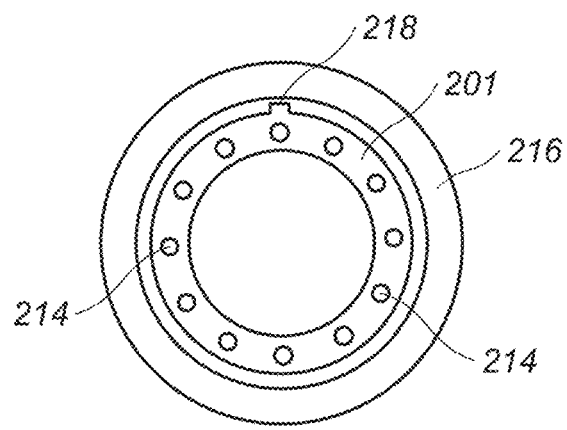
FIG. 2B is a plan elevation top view of an embodiment of the invention showing a pipe connection for pipe with electrical connections and snap-ring.

FIGS. 2A and 2B represent an embodiment of a suitable connection means, 200, for polymer composite casing pipe. The connection means not only connects the pipe joint together, but also allows substantially permanent, secure electrical connections. The electrical conduits provide electrical power cables, and logging and control cables (data cables), to be connected from topside equipment and the BHA components. A male joint of polymer pipe 201 is fitted into a female section of pipe 216. Electric and logging and control cables, 320 and 316 are encased in the walls of the pipe joints. Each joint of pipe will have a male section on one end and female section on the other end. As the casing string is made up the male section of a top joint is fitted into a female lower section of joint. The female section has side walls 202. Lock pin 206 holds the joints together and O rings 204 and 208 seal the connection. The lower end of the male section has a slot 214 into which fits a plug 212 on the top side of the female section joint so that when joined an electrical connection is completed between the electrical line 320 and 316. A guide slot 218 in FIG. 2B facilitates aligning the connections. An O-ring 210 seals the electrical connection. Pipe joints with this configuration may also be joined by a suitable fast drying adhesive such as epoxy adhesive. The adhesive may be sprayed or otherwise applied on the male and/or female section of the joints, or may be placed in the female section in an encasement that will be broken, and the adhesive released, when the pipe joints are pushed together. In some embodiments, the adhesive is capable of being broken without destruction of the pipe joints. In some embodiments, the adhesive is capable of being dissolved with solvents that do not damage the pipe joints.

Figure 3:
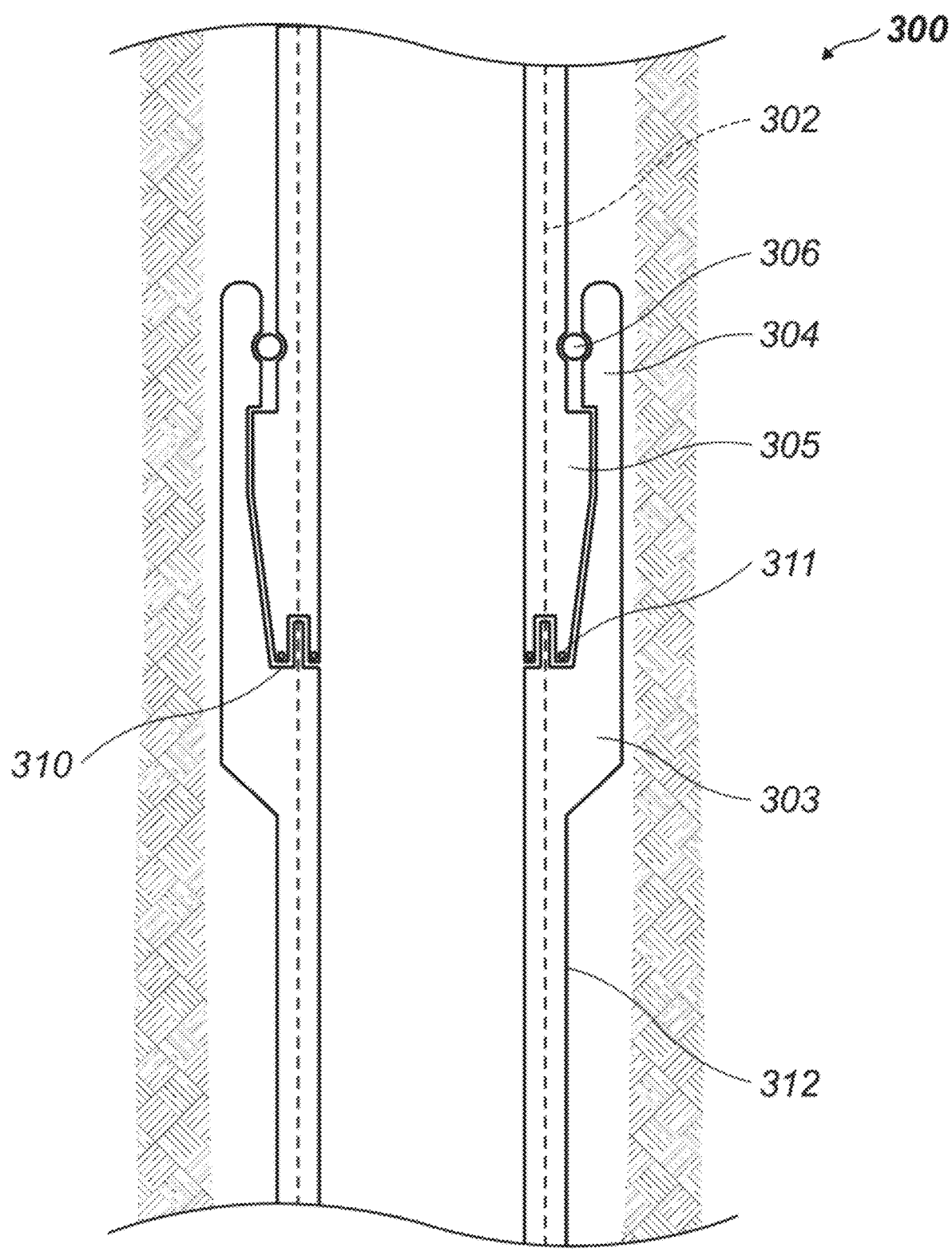
FIG. 3 is a plan elevation side view of an embodiment of the invention showing a pipe connection for pipe with electrical connections and flexible wedge connections.

FIG. 3 illustrates another method of composite pipe and electrical connection, 300. The male section of an upper pipe has a tapered end with compressible fingers, 305, with a shoulder that fits into the upper female section of a lower pipe 303 with a rim 304 that receives and retains the compressible fingers. In some embodiments, the rim 304 is in multiple sections, while in some embodiments it is solid. The electrical conduit line, 302, connection is made at 310 in the same way as the connection in the embodiment of FIGS. 2A and 2B. When the male and female sections are pressed together, the walls of the section 303 slightly expand to allow the tapered compressible fingers of the male section to be inserted. When seated, the shoulder of the tapered section engages a shoulder of the female section to fixedly join the sections together and O ring 306 seals the pipe joints. An O-ring 311 seals the electrical connection of conduit 510. Space is kept to reduce friction between the wellbore wall and outer wall 312 of the pipe-joints.

Figure 5:
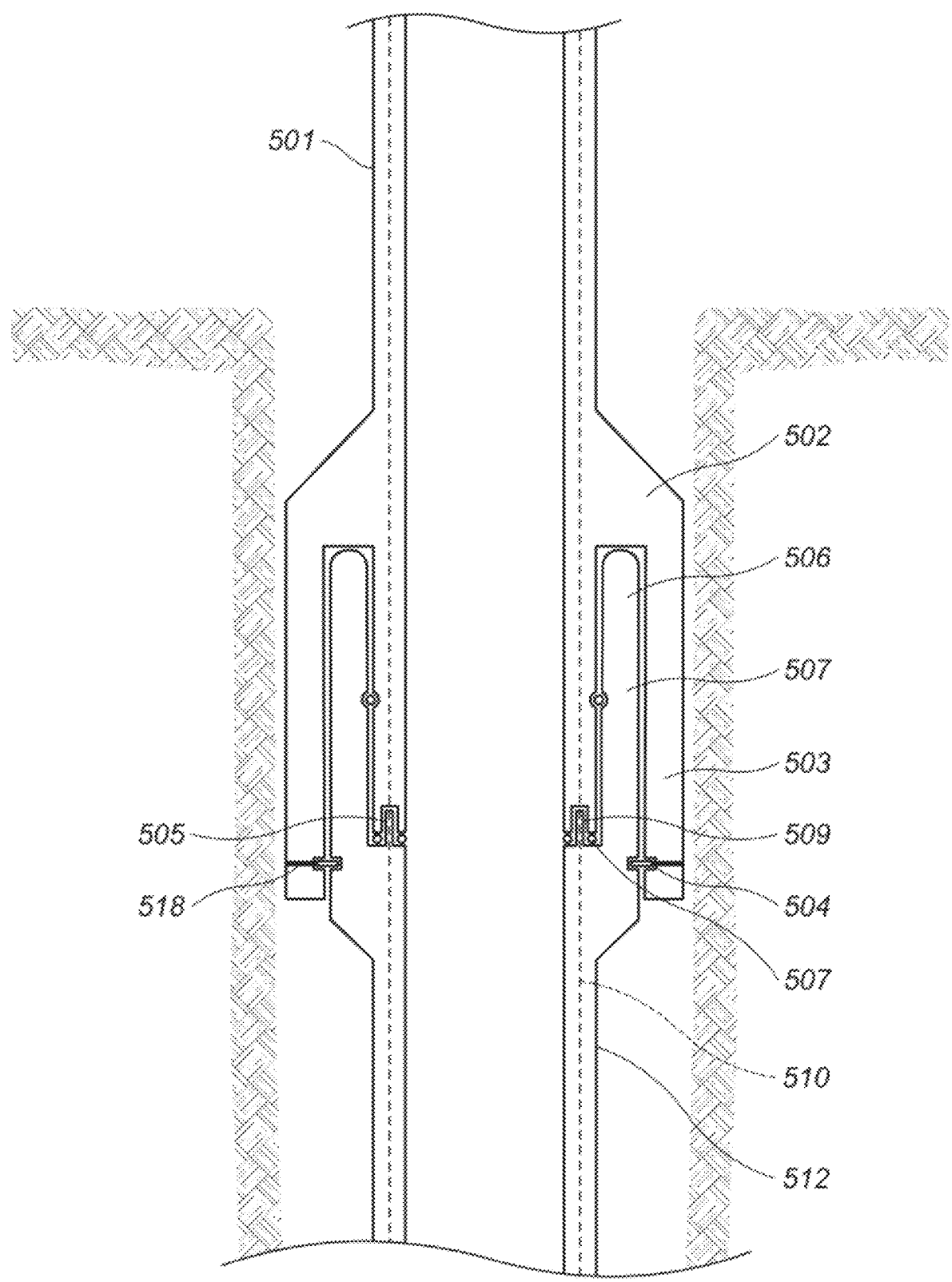
FIG. 5 is a plan elevation side view of an embodiment of the invention showing a top side pipe connection for pipe with electrical connections and snap-ring.
Figure 6A:
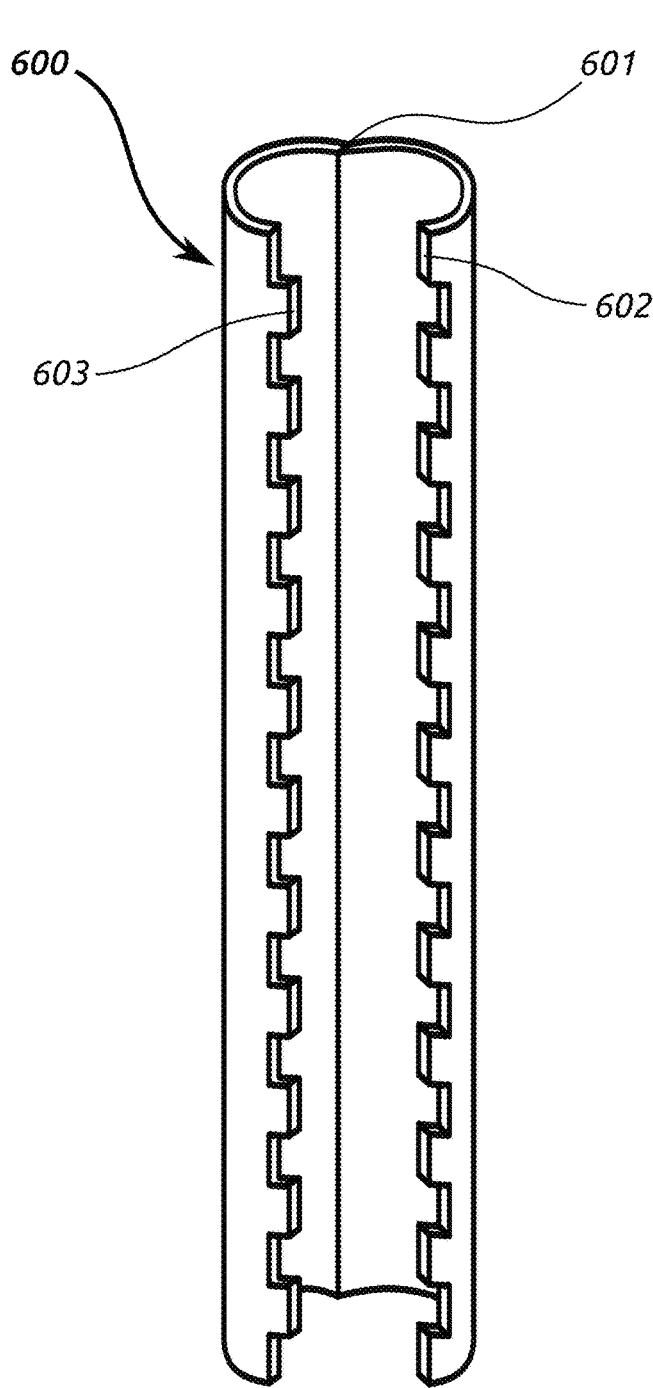
FIG. 6A is a perspective view of an open clamshell pipe section, used in embodiments of the invention, with interlocking rectangular geometric edge profiles.
Figure 6B:
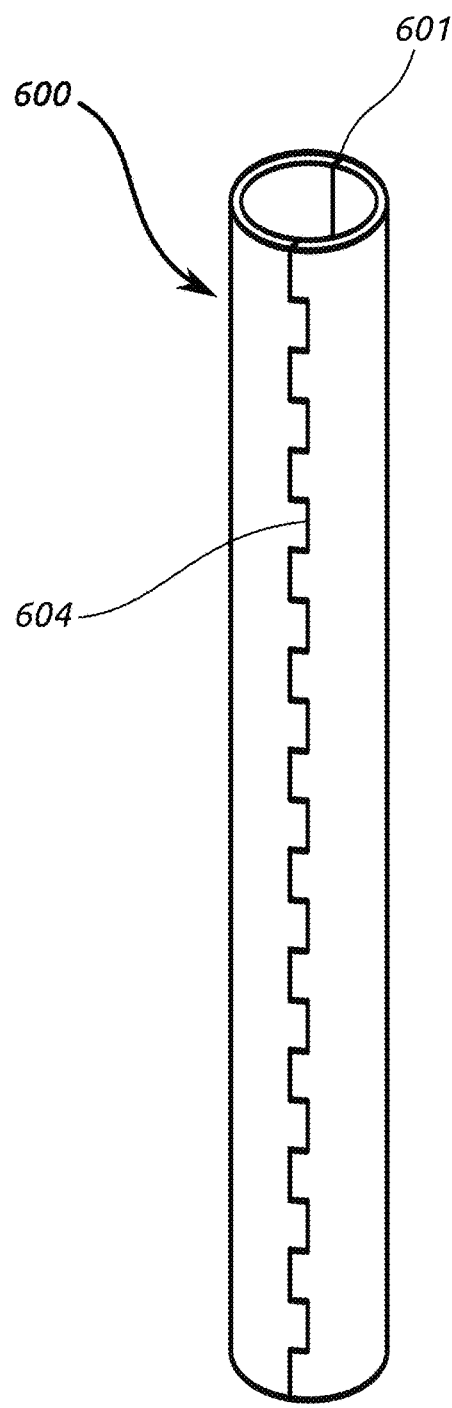
FIG. 6B is a perspective view of the clamshell pipe section of FIG. 6A when closed.
Figure 6C:
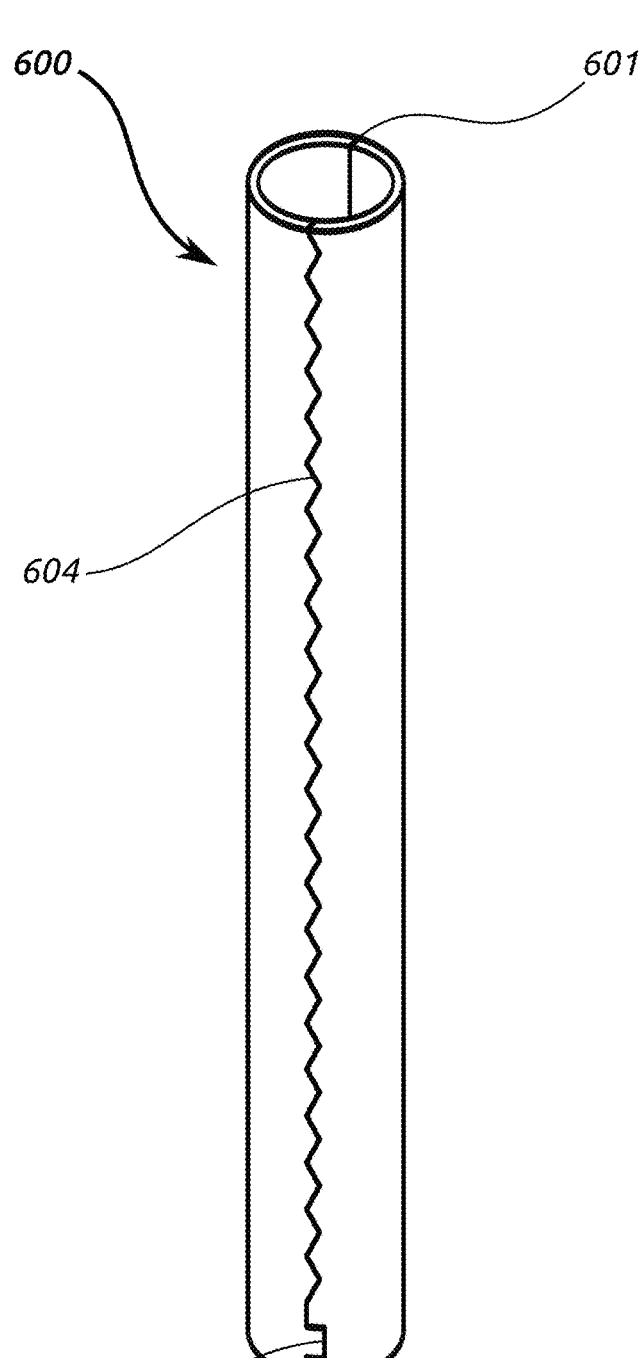
FIG. 6C is a perspective view of a closed clamshell pipe section, used in embodiments of the invention, with a seam with a key and a triangular geometric profile.
Figure 6D:
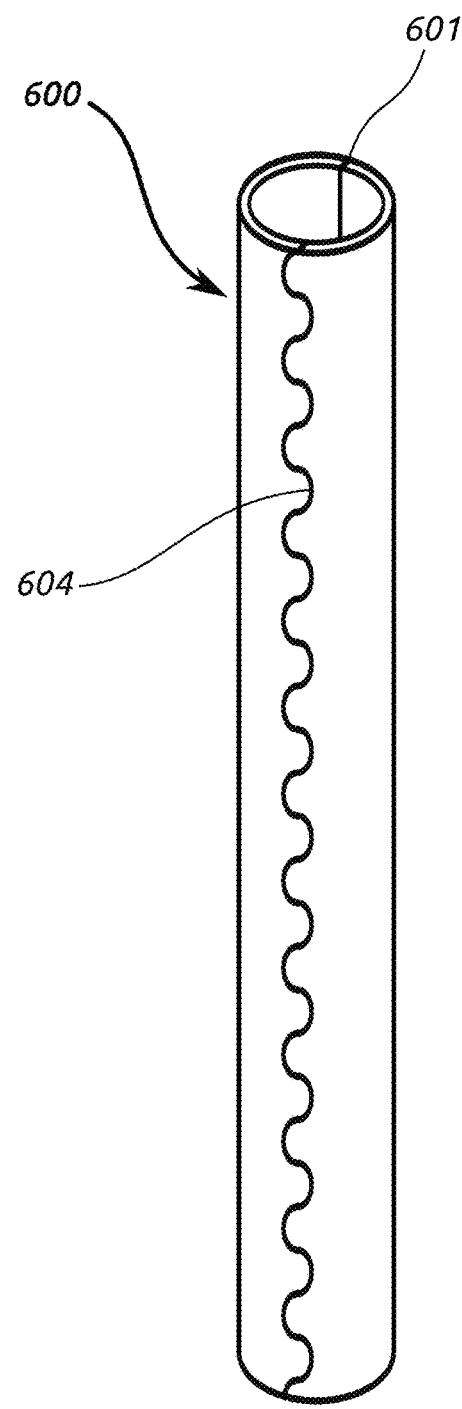
FIG. 6D is a perspective view of a closed clamshell pipe section, used in embodiments of the invention, with a seam with a wave geometric profile.

FIG. 5 is an embodiment of a surface fitting to attach to the pipe joints to maintain electrical connection when adding pipe joint to the casing string. An upper pipe 501 has a female bottom section 502 with fitting outer wall 503, into which fits a male upper section, 506, of the next lower pipe joint 512 fits and secured by a pin 504 that can be released to disconnect the pipe joints. Electrical connection between the pipe joint is made by connection of 509 into 505. O rings 507 seal the electrical joints and 518 is the snap ring release pin.

While the disclosed connections are well-suited for composite polymer pipes, and are taught herein in that context, they are also suitable for use in pipes made of metal, as well as pipes made of other materials.

Methods of Drilling with Systems Herein
Using a Central Retrieval Cable

In the operation of embodiments with a central retrieval cable, the BHA, and included electric motor, are connected with joint connections, as described herein, at the surface of the well, and the retrieval cable is disposed inside the joint connection. The drilling device is rotated at least with the motor(s) of the BHA. The drill pipe array is operated from the surface to direct the drilling device (in some embodiments by controlling a downhole steering device such as that disclosed in U.S. Pat. No. 4,828,050, issued May 9, 1989; U.S. Pat. No. 6,626,254, issued Sep. 30, 2003; and U.S. Pat. No. 6,708,783, issued Mar. 23, 2004, the disclosures of which are incorporated herein by reference as regards directional drilling) and to drive the pipe array and drill bit axially further into the hole being drilled.

As the depth of the hole approaches the length of the first pipe joint (or an initial pipe array), at least one pipe joint is added at the surface to create a pipe array or lengthen the initial pipe array, as appropriate, and permit continued drilling. As the initial length of the central retrieval cable is reached, another length of cable is added, which is of a larger diameter, if appropriate, as discussed elsewhere herein. This procedure continues until the desired depth is reached. After the desired depth is reached, the BHA is removed, the well is cased, either by finalizing the casing used to drill the well (such as by cementing in place) or by installing separate casing, and any down hole testing and/or production equipment is installed.

The drilling device is, in some embodiments, a pilot drill coupled with an expandable under reamer which drills a hole diameter larger than the outside diameter of the casing, such that the casing may be installed without undue resistance from friction. The pilot drill is smaller than the pipe bore or is expandable, and the reamer is expandable such that it fits down the well with the pipe installed (such as down the interior of the pipe string), and then expands to drill the desired diameter, which is larger than that of the channel through which it passes. Proper diameters for the pipe and drilling device used are readily ascertained by persons of ordinary skill in the art of well drilling.

In at least some embodiments used in longer wells, progressive drilling is used, wherein the procedure is reiterated with drilling devices of decreasing diameter and, in some embodiments, with drill or drill-casing pipe of decreasing diameter.

At least some of the advantages of such embodiments is the reduction or elimination of 'tripping' the pipe string, as the releasable connection and central cable allows the BHA to be removed without removing the entire pipe-string.

Bi-Rotational Drilling

The bi-rotational ability of this system allows the well to be drilled in a CW direction for a period of time, then the motor rotation, pipe rotation, or both is reversed, and the well is drilled in the opposite (CCW) direction for a period of time. This reduces overall wear and tear on the drill bits by being able to wear in two directions, and helps overcome a common cause for drill bit sticking. By drilling in both directions, the need to remove the BHA and drill bits for repair and replacement is greatly reduced.

In some embodiments, in determining the interval of drilling time between CW and CCW directions, shrinking diameter of the drilled hole is taken into account. The diameter of the drilled hole shrinks as the drilling surface wears and so decreases in diameter Therefore, if drilling occurs too long in one direction, the hole is too small to allow reversal of drilling direction for most available drilling devices.

Accordingly, in some such embodiments, the interval of drilling time between switching from CW to CCW and back again keeps the amount of wear before switching below a maximum tolerance. In some embodiments, this is controlled by simple time based on known rates of wear. Accordingly, in some embodiments, drilling is performed in one direction for approximately one (1) day, and then the drilling direction is reversed and drilling is performed in the reverse direction for approximately one (1) day before the drilling direction is reversed again, and soon.

In some embodiments, the interval of drilling time is determined in part based on gauging of the hole diameter, both for size and eccentricity. In some such embodiments, the drilling direction is reversed when the diameter of the hole drilled shrinks by a pre-determined amount, measured, for example, by down hole sensors, or by pausing and gauging diameter.

In some embodiments, the interval of drilling time is determined by measuring wear on the drilling device directly, either by retrieving the BHA and evaluating wear, or by down hole sensors, or by a combination thereof.

Bi-Rotational Drilling with Bi-Rotational Sleeve Couplers

Some embodiments encompass at least one method using a system using bi-rotational pipe joints and couplers as described above, at least some of which is described in detail in U.S. Pat. No. 9,995,089, issued Jun. 12, 2018 and already incorporated herein by reference. Various of the preferred method embodiments for drilling or servicing a bore hole in a geological formation comprise providing pipe joints having a bi-rotational rotation coupling system (such as is described elsewhere herein and in the referenced U.S. patent grant) capable of rotation in CW and CCW direction without decoupling, fitting a BHA to a collar or the first (lowermost) drill (or drill-casing) pipe joint, attaching additional joint(s) of pipe to the first drill pipe joint and to each other with a bi-rotational coupling connector means to form a bi-rotational drill string (such as are disclosed elsewhere herein), rotating the bi-rotational pipe string into a geological formation in one direction of rotation for a period of time then rotating the bi-rotational drill string into a geological formation in the opposite direction of rotation for a period of time.

Although drill string is used in reference to this section, drill-casing is used in some embodiments, as taught elsewhere herein.

Reversing Transmission

In various embodiments herein, at least one mud motor is used in the BHA. While currently known mud motors have various advantages, such as those discussed herein, they also are only capable of driving output in one rotation direction, due to their helical rotor design. Accordingly, the present invention provides, in some embodiments, a mud motor assembly comprising at least one reversing transmission connected to the output of known mud motors. In some embodiments, the assembly is integrated into a single apparatus.

In some embodiments having a reversing transmission, the reversing transmission is a planetary-type gearbox having at least a forward (e.g. CW) and reverse (e.g. CCW) gear pattern. The currently selected gear pattern is changed in various embodiments by a mechanically-actuated shifting mechanism (such as that actuated by a cable from the surface), by an electrically-actuated shifting mechanism, a pneumatically-actuated shifting mechanism, a hydraulically-actuated shifting mechanism, an automatic shifting mechanism, or some combination thereof. In some embodiments, an automatic shifting mechanism is provided that reverses the transmission when a rotational direction of the drill-casing, an electric motor, or both is reversed. In some embodiments, a single signal changes the direction of an electric motor and the reversing transmission. In some embodiments, the reversing transmission is 'slaved' to an electric motor such that the transmission direction is synced with the electric motor direction.

In some embodiments, the reversing transmission comprises two parallel shafts: an input shaft, and a reversing shaft. The input shaft turns the reversing shaft via gears attached to the shafts, and the reversing shaft drives an output shaft via a belt drive. A transmission housing retains, positions, and protects the shafts, gears, belt(s), etc., and the requisite bushings, bearings, etc.

In some embodiments having a reversing transmission, the reversing transmission has multiple speeds. Some such embodiments have multiple speeds in forward and reverse (CW and CCW) directions. Such embodiments provide an advantage of balancing power input between torque and speed according to the properties of the drill bit, the properties of the material being drilled, etc.

For example, a harder material may be penetrated more effectively at a slower speed and higher torque, while a softer material may be penetrated more effectively at a higher speed and lower torque. In some embodiments, a harder material is drilled between thirty-four to fifty (34-50) revolutions per minute (rpm), while a soft geological formation is drilled at a speed somewhere around one hundred fifty (150) rpm.

Accordingly, a multi-speed, bi-rotational transmission allows the drill speed to be optimized as the wellbore progressed through various materials. Known reversing transmissions, which are suitable for adaptation to some embodiments of the present invention, include patent grants U.S. Pat. Nos. 3,915,033A and 6,186,922B1, which are incorporated herein by reference as relates to a reversing transmission.

In some embodiments, the reversing transmission is a one-to-one (1:1) input-to-output planetary gear-set having two ranges: forward or reverse (e.g. CW and CCW). A shifting mechanism moves the input shaft axially up or down, the input shaft having at least one gear thereon (the sun gear(s)), into alignment with either the forward range or reverse range. Planetary gears drive another gear ring, which drives the output. In some similar embodiments, the reversing transmission is not necessarily 1:1, and may have multiple gear ranges in both forward and reverse.

In some embodiments, the reversing transmission comprises a worm gear assembly, wherein the mud motor drives a worm screw. A shifting mechanism aligns the worm screw with one of at least two output gears (forward or reverse). Some such embodiments have multiple output gears, further gearing to provide a desired speed multiplier(s), or combinations thereof.

Other suitable reversible transmissions are within the capability of those of ordinary skill in the art.

Integrated Components

As referred to elsewhere herein, in various embodiments, one or more components are integrated together or into other structures. For example, in some embodiments, the RTAM is integrated into a motor. In some embodiments, the RSD is integrated into the pipe. In some embodiments, the pipe joint connectors are integrated into the pipe joints. In some embodiments, the electrical and retrieval cable are integrated, such as is discussed elsewhere herein.

In some embodiments, the electric motors and/or the mud motors are modular—one or more are attached end-to-end to multiply power. In some embodiments, the electric and mud motors are combined into a single integrated unit. In some such embodiments, a plurality of integrated electric-mud motors are attached end-to-end to multiply power output available.

In some embodiments, cable connectors are integrated into the cable lengths. As discussed herein, in some embodiments, power, data, or control cables are integrated into the pipe walls, attached thereto, or both. In some embodiments, clutches are integrated into the motors. Various other integrations are readily appreciated when the description herein is read and understood.

CONCLUSION

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept. The specification and drawings are, accordingly, to be regarded in an illustrative rather than a restrictive sense. Therefore, unless otherwise specified, the scope of the invention should be limited only by the appended claims.

I claim:

1. A bi-directional well drilling system capable of drilling in both a clockwise (CW) and a counterclockwise (CCW) direction, the system comprising:
   (a) at least one drill-casing array comprising a plurality of pipe joints joined with gyro-locked and fluidly sealed connections and capable of sustained rotation in both the directions;
   (b) a bottom hole assembly releasably connected to the bottom of the drill-casing array and capable of sustained rotation in both the directions, and comprising:
      (i) at least one bi-directional electric motor;
      (ii) at least one bi-directional mud motor assembly comprising: (1) at least one mud motor and (2) a reversing transmission with at least a forward drive and reverse drive, wherein the mud motor assembly drives an output load in both the directions; and
      (iii) at least one bi-directional drilling device;
      (iv) at least one drill bit; and
   (c) at least one retrieval-electrical cable assembly suspended inside the drill-casing and comprising an electric cable sized capable of supplying sufficient power to the at least one electric motor to drive the drill bit;
   wherein the bottom hole assembly is suspended from the cable assembly such that the bottom hole assembly is capable of being withdrawn from the drill-casing by the cable after releasing the connection to the drill-casing and retracting the drill bit.

2. The system of claim 1 wherein the at least one mud motor assembly is connected to the output of the at least one electric motor, and wherein the at least one drilling device is attached to the output of the reversing transmission.

3. The system of claim 1 wherein the drilling device cuts a hole of a diameter greater than an outside diameter of the drill-casing array, and wherein the drill bit is capable of retracting to fit inside the drill-casing array.

4. The system of claim 1 wherein the cable is constructed of discrete lengths of different diameters, the diameters being progressively smaller, with the smallest diameter cable being the cable nearest the bottom hole assembly.

5. The system of claim 1 wherein the pipe joints are composite polymer pipes.

6. The system of claim 1 wherein the pipe joints are clamshell pipe joints.

7. The system of claim 1 wherein the clamshell pipe joints comprise at least two seam edges with interlocking geometry.

8. The system of claim 1 wherein the seam edges come together to form a seam when the clamshell pipe joint is in a closed position, and at least one portion of the seam comprises at least one key, the key being a portion of each seam edge having complementary geometry different than the rest of the two seam edges such that the key ensures that the seam is properly aligned axially when the clamshell pipe joint is closed.

9. The system of claim 1 wherein the pipe joints are connected together with a connection comprising a first pipe joint having a top end and a bottom end and in which the bottom end comprises a taper with a shoulder on the taper configured to fit into the top end of a second pipe joint having a top end and a bottom end that has a side wall describing an annular space to receive the taper of the bottom end of the first joint and which has a shoulder configured to mate with the shoulder of the first joint when the first and second pipe joints are pressed together.

10. The system of claim 1 comprising means to connect an electrical conduit in a first pipe joint to an electrical conduit in a second pipe joint to make a secure electrical connection.

11. The system of claim 1 wherein the pipe joints are composite polymer pipes and wherein the electrical conduit in the first and second pipe joints carry at least one of: control signals, data signals, and any combination thereof.

12. The system of claim 1 wherein the connected pipe joints are connected to the bottom hole assembly and configured in a manner to allow effective rotation of the pipe string at the surface to rotate the drilling device disposed in the bottom hole assembly.

13. The system of claim 1 comprising a drill pipe coupling system capable of rotation in both the CW and the CCW directions without decoupling comprising:
   (a) a first drill pipe with an end having an end structure comprising an elongated cylindrical sleeve open at one end and partially closed at the other end, the closed end having an opening sized to allow a section of drill pipe to pass through and having screw threads located at about mid-point on the inside diameter surface,
   (b) a second drill pipe with an end having a cylindrical guide structure surrounding and attached to the end of the second drill pipe, the sleeve having screw threads located at about mid-point located on the outside diameter surface of the cylindrical guide structure and a recess for a seal at a point above the screw threads; and
   wherein the first drill pipe sleeve has an internal diameter sized to fit over the cylindrical guide structure of the second pipe structure and wherein drill pipe distal end edges of the first and second drill pipes has end edges that are sloped, saw tooth shaped or curved end sections and configured so that the edges of the first and second pipes are mated when the ends are abutted together.

14. A method for bi-directional drilling in geological formations in both a clockwise (CW) and a counterclockwise (CCW) direction, the method comprising:
   (a) providing a drill-casing array comprising a plurality of pipe joints joined with gyro-locked and fluidly sealed connections and capable of sustained rotation in both the directions;

(b) providing a bottom hole assembly releasably connected to the bottom of the drill-casing array and capable of sustained rotation in both the directions, and comprising:
  (i) at least one bi-directional electric motor,
  (ii) at least one bi-directional mud motor assembly comprising: (1) at least one mud motor and (2) a reversing transmission with at least a forward drive and a reverse drive, wherein the mud motor assembly drives an output load in both the directions; and
  (iii) at least one bi-directional drilling device;
  (iv) at least one drill bit; and
(c) providing at least one retrieval-electrical cable assembly suspended inside the drill-casing and comprising an electric cable sized capable of supplying sufficient power to the at least one electric motor to drive the drill bit; and
(d) suspending the bottom hole assembly from the electrical cable assembly such that the bottom hole assembly is capable of being withdrawn from the drill-casing by the electrical cable after releasing the connection to the drill-casing and retracting the drill bit.

15. The method of claim 14 wherein drilling rotation direction is repeatedly alternated between the CW and the CCW directions.

16. The method of claim 15 wherein drilling rotation is alternated at a pre-determined time interval.

17. The method of claim 15 wherein the time interval is one (1) day.

18. The method of claim 15 wherein drilling rotation is alternated according to a pre-determined parameter selected from the group consisting of: drilling device wear, wellbore diameter, drilling device rotational drag, wellbore radius, or any combination thereof.

19. The method of claim 14 wherein the pipe array comprises pipe joints coupled together with a bi-rotational rotation coupling system capable of rotation in both the CW and CCW directions without decoupling, and the bi-rotational rotation coupling system comprises:
  (i) a first drill pipe with an end having an end structure comprising an elongated cylindrical sleeve open at one end and partially closed at the other end, the closed end having an opening sized to allow a 4 section of drill pipe to pass through and having screw threads located at mid-point on the inside diameter surface, and
  (ii) a second drill pipe with an end having a cylindrical guide structure surrounding and attached to the end of the second drill pipe, the sleeve having screw threads located at mid-point located on the outside diameter surface of the cylindrical guide structure and a recess for a seal at a point above the screw threads; and
  wherein the first drill pipe sleeve has an internal diameter sized to fit over the cylindrical guide structure of the second pipe structure and wherein drill pipe distal end edges of the first and second drill pipes have end edges that are sloped, saw tooth shaped or curved end sections and configured so that the edges of the first and second pipes are mated when the ends are abutted together.

* * * * *